US008924337B2

(12) United States Patent
Malik et al.

(10) Patent No.: US 8,924,337 B2
(45) Date of Patent: Dec. 30, 2014

(54) RECURSIVE BAYESIAN CONTROLLERS FOR NON-LINEAR ACOUSTIC ECHO CANCELLATION AND SUPPRESSION SYSTEMS

(75) Inventors: Sarmad Malik, Bochum (DE); Gerald Enzner, Bochum (DE); Jukka Petteri Vartiainen, Tampere (FI); Jari Petteri Sjoberg, Kangasala (FI); Ville Mikael Myllyla, Tampere (FI)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 13/068,341

(22) Filed: May 9, 2011

(65) Prior Publication Data
US 2012/0290525 A1 Nov. 15, 2012

(51) Int. Cl.
*G06N 7/02* (2006.01)

(52) U.S. Cl.
USPC .......................................................... 706/52

(58) Field of Classification Search
None
See application file for complete search history.

(56) References Cited

U.S. PATENT DOCUMENTS

| | | | | |
|---|---|---|---|---|
| 5,995,620 | A * | 11/1999 | Wigren | 379/406.09 |
| 6,282,286 | B1 | 8/2001 | Reesor et al. | 379/410 |
| 7,003,099 | B1 | 2/2006 | Zhang et al. | 379/406.03 |
| 7,480,595 | B2 * | 1/2009 | Nishiyama | 703/1 |
| 7,672,445 | B1 | 3/2010 | Zhang et al. | 379/406.01 |
| 2005/0008144 | A1 | 1/2005 | Gunther | 379/406.08 |
| 2007/0041575 | A1 | 2/2007 | Alves et al. | 379/406.08 |
| 2008/0247536 | A1 | 10/2008 | Rahbar | 379/406.08 |
| 2009/0274315 | A1 | 11/2009 | Carnes et al. | 381/66 |
| 2010/0189274 | A1 | 7/2010 | Thaden et al. | 381/66 |

FOREIGN PATENT DOCUMENTS

| | | |
|---|---|---|
| EP | 0 534 837 A1 | 3/1993 |
| WO | WO 99/29094 | 6/1999 |

OTHER PUBLICATIONS

Dadic, Somek, Pinezic, "Acoustic Echo Cancellation in Mobile Radio by Adaptive Legendre Filtering", Applied Electromagnetics and Communications, 2003. ICECom 2003. 17th International Conference on, Oct. 1-3, 2003, pp. 143-146.*

Barker, Brown, Martin, "Bayesian Estimation and Kalman Filter", ComputersMath Applications, vol. 30, No. 10, 1995, pp. 55-77.*

(Continued)

*Primary Examiner* — Kakali Chaki
*Assistant Examiner* — Walter Hanchak
(74) *Attorney, Agent, or Firm* — Harrington & Smith

(57) ABSTRACT

Both a cascade and a multichannel joint Bayesian estimator are provided for suppressing acoustic echo. An expansion basis (Power/Fourier series) is selected to convert a sample-based input signal $x_t$ into a DFT-domain multichannel signal $[X_{\tau,1}, \ldots X_{\tau,p}]$. The posterior of unknown states (e.g., mean $\hat{W}_\tau$ and covariance $P_\tau$ of the echo path $W_\tau$ and the mean $\hat{a}_\tau$ and covariance $Q_\tau$ of the nonlinear coefficients $a_\tau$; or channel-wise mean $\hat{W}_{\tau,i}$ and multichannel covariance $\underline{P}_\tau$ of a compound quantity formed by merging together the echo path $W_\tau$ and the i$^{th}$ nonlinear coefficient $a_{\tau,i}$) and model parameters $\theta_\tau$ are estimated; and Kalman gain factor(s) $K_\tau$ are computed for optimal adaptation of the posterior of unknown states. An echo signal $\hat{Y}_\tau$ is estimated using the multichannel input signal $[X_{\tau,1}, \ldots X_{\tau,p}]$ and the adapted posterior; and an error signal $E_\tau$ is generated. Residual echo is suppressed by post-filtering the error signal $E_\tau$ with a weighting function $\psi_\tau$ which depends on the adapted posterior, and the filtered error signal $\hat{S}'_t$ is then transmitted to a far-end.

20 Claims, 14 Drawing Sheets

(56) References Cited

OTHER PUBLICATIONS

Helwani, Buchner, Spors, "On the Robust and Efficient Computation of the Kalman Gain for Multichannel Adaptive Filtering with Application to Acoustic Echo Cancellation", Signals, Systems and Computers (ASILOMAR), 2010 Conference Record of the Forty Fourth Asilomar Conference on, Nov. 7, 2010, pp. 988-992.*

Zhang, Cai, Stokes, "Multichannel Acoustic Echo Cancellation in Multiparty Spatial Audio Conferencing with Constrained Kalman Filtering", Proceedings of the 11th International Workshop on Acoustic Echo and Noise Control Seattle, Washington USA, Sep. 14-17, 2008, pp. 1-4.*

Stenger, et al., "RLS-Adapted Polynomial for Nonlinear Acoustic Echo Cancelling", Telecommunications Laboratory, University of Erlangen-Nuremberg, (4 pages).

Kuech, et al., "Nonlinear Acoustic Echo Cancellation Using Adaptive Orthogonalized Power Filters", Multimedia Communications and Signal Processing, University of Erlangen-Nuremberg, (4 pages).

Zhou, et al., "Sub-band Implementation of Adaptive Nonlinear Filer for Adaptive Nonlinear Echo Cancellation", Journal of Multimedia, vol. 2, No. 2, Apr. 2007, (pp. 77-82).

Shi, et al., "Acoustic Echo Cancellation Using a Pseudocoherence Function in the Presence of Memoryless Nonlinearity", IEEE Transactions on Circuits and Systems, vol. 55, No. 9, Oct. 2008, (pp. 2639-2649).

Stenger, et al., "Adaptation of Acoustic Echo Cancellers Incorporating a Memoryless Nonlinearity", IEEE Workshop on Echo Noise Control (IWAENC '99), Pocono Manor, PA, Sep. 1999, (4 pages).

Walter Kellermann, "Echoes and Noise with Seamless Acoustic Man-Machine Interfaces-The Challenge Persists", Sep. 1, 1999, (31 pages).

* cited by examiner

EQUATIONS FOR THE VBSSFDAF:

$$\hat{W}^+_{T-1} = A \cdot \hat{W}_{T-1} \tag{1}$$

$$P^+_{T-1} = A^2 \cdot P_{T-1} + \Psi^\Delta_T \tag{2}$$

$$\Omega_T = \frac{R}{M} \sum_{i=1}^{p} Q_{T,ii} X^H_{T,i} \Psi^{S^{-1}}_T X_{T,i}; \quad \hat{\tilde{X}}_T = \sum_{i=1}^{p} \hat{a}_i X_{T,i} \tag{3}$$

$$\tilde{P}^+_{T-1} = \left[ \Omega_T + P^{+^{-1}}_{T-1} \right]^{-1} \tag{4}$$

$$K_{\omega,T} = \tilde{P}^+_{T-1} \hat{\tilde{X}}^H_T \left[ \hat{\tilde{X}}_T \tilde{P}^+_{T-1} \hat{\tilde{X}}^H_T + \frac{M}{R} \Psi^S_T \right]^{-1} \tag{5}$$

$$V_T = \tilde{P}^+_{T-1} P^{+^{-1}}_{T-1} \tag{6}$$

$$\hat{W}_T = V_T \hat{W}^+_{T-1} + K_{\omega,T} \left[ Y_T - \hat{\tilde{C}}_T V_T \hat{W}^+_{T-1} \right] \tag{7}$$

$$P_T = \left[ I_M - \frac{R}{M} K_{\omega,T} \hat{\tilde{X}}_T \right] \tilde{P}^+_{T-1} \tag{8}$$

$$\hat{a}^+_{T-1} = B \cdot \hat{a}_{T-1} \tag{9}$$

$$Q^+_{T-1} = B^2 \cdot Q_{T-1} + \Psi^a_T \tag{10}$$

$$\Lambda_{T,ii} = \frac{R}{M} \text{Tr} \left\{ X^H_{T,i} \Psi^{S^{-1}}_T X_{T,i} P_T \right\} \tag{11}$$

$$\tilde{Q}^+_{T-1} = \left[ \Lambda_T + Q^{+^{-1}}_{T-1} \right]^{-1} \tag{12}$$

$$\underline{\widehat{CW}}_T = \left[ C_{T,1} \hat{W}_T, \ldots, C_{T,p} \hat{W}_T \right] \tag{13}$$

$$K_{a,T} = \tilde{Q}^+_{T-1} \underline{\widehat{CW}}^H_T \left[ \underline{\widehat{CW}}_T \tilde{Q}^+_{T-1} \underline{\widehat{CW}}^H_T + \Psi^S_T \right]^{-1} \tag{14}$$

$$U_T = \tilde{Q}^+_{T-1} Q^{+^{-1}}_{T-1} \tag{15}$$

$$\hat{a}_T = U_T \hat{a}^+_{T-1} + K_{a,T} \left[ Y_T - \underline{\widehat{CW}}_T U_T \hat{a}^+_{T-1} \right] \tag{16}$$

$$Q_T = \left[ I_p - K_{a,T} \underline{\widehat{CW}}_T \right] \tilde{Q}^+_{T-1} \tag{17}$$

FIG.2C

SYMBOL LIST FOR THE VBSSFDAF:

$\hat{W}_{T-1}$ = ESTIMATED MEAN OF THE ECHO PATH STATE AT BLOCK-TIME $T-1$ $\hat{W}^+_{T-1}$ = PREDICTED MEAN OF THE ECHO PATH STATE AT BLOCK-TIME $T$ $A$ = ECHO PATH STATE-TRANSITION COEFFICIENT $P_{T-1}$ = ECHO PATH STATE ERROR COVARIANCE AT BLOCK-TIME $T-1$ $P^+_{T-1}$ = ECHO PATH PREDICTED STATE ERROR COVARIANCE AT BLOCK-TIME $T$ $\Psi^\Delta_T$ = ECHO PATH PROCESS NOISE COVARIANCE AT BLOCK-TIME $T$ $\Omega_T$ = ECHO PATH ASSIMILATION TERM AT BLOCK-TIME $T$ $R$ = FRAME-SHIFT $M$ = FRAME-SIZE $p$ = NONLINEAR EXPANSION ORDER $\Psi^S_T$ = OBSERVATION NOISE COVARIANCE AT BLOCK-TIME $T$ $X_{T,i}$ = $i$-th ORDER OF THE NONLINEARLY MAPPED INPUT SIGNAL AT BLOCK-TIME $T$ $\tilde{X}_T$ = ESTIMATED NONLINEARLY MAPPED INPUT SIGNAL AT BLOCK-TIME $T$ $\hat{a}_i$ = ESTIMATE OF THE $i$-th ORDER NONLINEAR COEFFICIENT AT BLOCK-TIME $T$ $\tilde{P}^+_{T-1}$ = MODIFIED PREDICTED ECHO PATH STATE ERROR COVARIANCE AT BLOCK-TIME $T$ $K_{\omega,T}$ = ECHO PATH KALMAN GAIN AT BLOCK-TIME $T$ $V_T$ = ECHO PATH STATE UPDATE FACTOR AT BLOCK-TIME $T$ $\hat{W}_T$ = ESTIMATED MEAN OF THE ECHO PATH STATE AT BLOCK-TIME $T$ $Y_T$ = MICROPHONE SIGNAL AT BLOCK-TIME $T$ $P_T$ = ECHO PATH STATE ERROR COVARIANCE AT BLOCK-TIME $T$ $\hat{a}_{T-1}$ = ESTIMATED MEAN OF THE NONLINEAR COEFFICIENTS AT BLOCK-TIME $T-1$ $\hat{a}^+_{T-1}$ = PREDICTED MEAN OF THE NONLINEAR COEFFICIENTS AT BLOCK-TIME $T$

FIG.2D-1

| FIG.2D-1 |
| FIG.2D-2 | FIG.2D

B = NONLINEAR COEFFICIENT STATE-TRANSITION COEFFICIENT
$Q_{T-1}$ = NONLINEAR COEFFICIENT ERROR COVARIANCE AT BLOCK-TIME $T-1$
$Q_{T-1}^+$ = NONLINEAR COEFFICIENT PREDICTED ERROR COVARIANCE AT BLOCK-TIME $T$
$\Psi_T^a$ = NONLINEAR COEFFICIENT PROCESS NOISE COVARIANCE AT BLOCK-TIME $T$
$\Omega_T$ = NONLINEAR COEFFICIENT ASSIMILATION TERM AT BLOCK-TIME $T$
$C_{T,i}$ = i-th ORDER OF THE CONSTRAINED NONLINEARLY MAPPED INPUT SIGNAL AT BLOCK-TIME $T$
$\tilde{Q}_{T-1}^+$ = MODIFIED PREDICTED NONLINEAR COEFFICIENT ERROR COVARIANCE AT BLOCK-TIME $T$
$K_{a,T}$ = NONLINEAR COEFFICIENT KALMAN GAIN AT BLOCK-TIME $T$
$U_T$ = NONLINEAR COEFFICIENT UPDATE FACTOR AT BLOCK-TME $T$
$\hat{a}_T$ = ESTIMATED MEAN OF THE NONLINEAR COEFFICIENTS AT BLOCK-TIME $T$
$Q_T$ = NONLINEAR COEFFICIENT ERROR COVARIANCE AT BLOCK-TIME $T$

FIG.2D-2

EQUATIONS FOR THE BD-MCSSFDAF:

$$\hat{W}^+_{T-1,i} = A_i \hat{W}_{T-1,i} \qquad (18)$$

$$P^+_{T-1,i,j} = A_i P_{T-1,i,j} A_j + \Psi^\Delta_{T,i,j} \qquad (19)$$

$$D'_T = \left[ \sum_{j=1}^{p} \sum_{i=1}^{p} X_{T,i} P^+_{T-1,i,j} X^H_{T,j} + \frac{M}{R} \Psi^S_T \right] \qquad (20)$$

$$K_{T,i} = \left[ \sum_{j=1}^{p} P^+_{T-1,i,j} X^H_{T,j} \right] D'^{-1}_T \qquad (21)$$

$$E_T = Y_T - \underline{C}_T \hat{\underline{W}}^+_{T-1} \qquad (22)$$

$$\hat{W}_T = \hat{W}^+_{T-1,i} + K_{T,i} E_T \qquad (23)$$

$$P_{T,i,j} = P^+_{T-1,i,j} - \frac{R}{M} \cdot K_{T,i} \left[ \sum_{i=1}^{p} X_{T,i} P^+_{T-1,i,j} \right] \qquad (24)$$

EQUATIONS FOR THE CHANNELWISE ADAPTATION
CONTROLLER OF THE LOW COMPLEXITY FD-MCSSFDAF:

$$P^+_{T-1,i,i} = A_i^2 \cdot P_{T-1,i,i} + \Psi^\Delta_{T,i,i} \qquad (25)$$

$$D'_T = \left[ \sum_{i=0}^{p} X_{T,i} P^+_{T-1,i,i} X^H_{T,i} + \frac{M}{R} \Psi^S_T \right] \qquad (26)$$

$$K_{T,i} = P^+_{T-1,i,i} X^H_{T,i} D'^{-1}_T \qquad (27)$$

$$P_{T,i,i} = \left[ I_M - \frac{R}{M} K_{T,i} X_{T,i} \right] P^+_{T-1,i,i} \qquad (28)$$

FIG.3B

SYMBOL LIST FOR THE BD– AND FD–MCSSFDAF:

$\hat{W}_{\tau-1,i}$ = ESTIMATED ECHO PATH MEAN FOR THE i-th CHANNEL AT BLOCK-TIME $\tau-1$ $\hat{W}_{\tau,i}$ = ESTIMATED ECHO PATH MEAN FOR THE i-th CHANNEL AT BLOCK-TIME $\tau$ $\hat{W}^+_{\tau,i}$ = PREDICTED ECHO PATH MEAN FOR THE i-th CHANNEL AT BLOCK-TIME $\tau$ $A_i$ = STATE-TRANSITION COEFFICIENT FOR i-th CHANNEL $P_{\tau-1,i,j}$ = ESTIMATED ERROR CROSS-COVARIANCE BETWEEN THE i-th AND j-th CHANNEL AT BLOCK-TIME $\tau-1$ $P^+_{\tau-1,i,j}$ = PREDICTED ERROR CROSS-COVARIANCE BETWEEN THE i-th AND j-th CHANNEL AT BLOCK-TIME $\tau$ $\psi^\Delta_{\tau,i,j}$ = PROCESS NOISE CROSS-COVARIANCE BETWEEN THE i-th AND j-th CHANNEL AT BLOCK-TIME $\tau$ $\underline{P}^+_{\tau-1}$ = PREDICTED MULTICHANNEL STATE ERROR COVARIANCE AT BLOCK-TIME $\tau$ $\underline{P}_\tau$ = MULTICHANNEL STATE ERROR COVARIANCE AT BLOCK-TIME $\tau$ $\underline{\psi}^\Delta_\tau$ = MULTICHANNEL PROCESS NOISE COVARIANCE AT BLOCK-TIME $\tau$ $D'_\tau$ = MULTICHANNEL RESIDUAL STATE-ERROR COVARIANCE AT BLOCK-TIME $\tau$ $K_{\tau,i}$ = KALMAN GAIN FOR THE i-th CHANNEL AT BLOCK-TIME $\tau$ $E_\tau$ = COMMON ERROR SIGNAL AT BLOCK-TIME $\tau$ $Y_\tau$ = MICROPHONE SIGNAL AT BLOCK-TIME $\tau$ $R$ = FRAME-SHIFT $M$ = FRAME-SIZE $p$ = NONLINEAR EXPANSION ORDER $\psi^S_\tau$ = OBSERVATION NOISE COVARIANCE AT BLOCK-TIME $\tau$ $X_{\tau,i}$ = i – th ORDER OF THE NONLINEARLY MAPPED INPUT SIGNAL AT BLOCK-TIME $\tau$

FIG.3C

| FIG. 4A |
|---------|
| FIG. 4B |

US 8,924,337 B2

RECURSIVE BAYESIAN CONTROLLERS FOR NON-LINEAR ACOUSTIC ECHO CANCELLATION AND SUPPRESSION SYSTEMS

TECHNICAL FIELD

The exemplary and non-limiting embodiments of this invention relate generally to wireless communication systems, methods, devices and computer programs and, more specifically, relate to non-linear acoustic echo/noise cancellation such as may be employed in portable devices such as hand-free mobile telephony systems.

BACKGROUND

With the wider adoption of smartphones and Internet telephony there has been a corresponding increase in the volume of hands-free mobile telephony. By example smartphones utilize traditional cellular spectrum while laptop/notebook computers as well as smartphones often employ a WiFi or other local network as an on-ramp to the Internet for voice and/or video calls. Additionally, handsets can link via Bluetooth to a car radio to implement hands-free operation using the handset microphone and the radio speakers. Hands-free mobile telephony is expected to continue its increase in popularity.

Hardware manufacturers have typically implemented their hand-free devices with mass produced low cost loudspeakers. Qualitatively these are adequate in a limited range of linear operation, but the input signal to the loudspeaker is often outside that range and so that input signal is non-linearly transformed by the loudspeaker itself. This transformation proves problematic for conventional echo cancellation algorithms, which in practice now have to cope with the non-linear echo as well as the linear echo.

A transmitted signal which re-appears, with some delay in the transmitted or received signal, is with some qualification an acoustic echo to the originally transmitted signal. In the acoustic arts this is termed an echo signal, and a variety of software cancellation algorithms have been developed to eliminate it, often implemented in a device's voice engine. By example, a talker's voice representing what is termed a far-end signal is received at a handset receiver and output from the handset loudspeaker. This loudspeaker output is then picked up at the handset's microphone to be transmitted back to the original talker with some delay. The path directly between the loudspeaker and the microphone is termed the direct acoustic path but it is not the only one, there are further echo paths as the loudspeaker's output signal bounces around the handset's environment before being picked up at the microphone. Eliminating this echo signal while still retaining intended sounds picked up by the microphone in a full duplex operation (or full multiplex for conference calling) is the challenge of echo cancellation. Low cost loudspeakers with limited linear range result in a larger portion of the whole echo signal lying in the non-linear regime, and result in conventional echo cancellation algorithms designed primarily for a linear response to be less effective against the whole echo signal.

It is well known in the acoustic arts that a low cost loudspeaker for a mobile device can be modeled effectively by a memoryless non-linearity. One problem lies in identifying both the non-linear distortion and the linear acoustic echo path, and of course subsequent generation and cancellation of the acoustic echo to negate them. FIG. 1 illustrates this problem.

The far-end signal $x_t$, which by example is input to FIG. 1 from a radio receiver Rx of the mobile telephony device of which FIG. 1 forms a part, undergoes an unknown non-linear transformation $f[\ldots]$ due to the loudspeaker 102. The non-linearly mapped far-end signal $f[x_t]$ then gets linearly convolved with the linear acoustic echo path $w_t$ to give the non-linear echo signal $d_t$. The non-linear echo signal $d_t$ is superimposed by the near-end disturbance $s_t = s'_t + n_t$ to give the signal $y_t$ which is picked up and output by the microphone 104. Here $s'_t$ and $n_t$ represent the near-end speech and observation noise, respectively. The twofold task then of the non-linear echo canceller 106 is to come up with an estimate $\hat{w}_{1,t}$ of the acoustic echo path $w_t$ as well as an estimate $\hat{f}[\ldots]$ of the nonlinearity introduced in the system by the loudspeaker 104. The estimated echo signal $\hat{d}_t$, which is generated using the estimates of the echo path and the nonlinear mapping, is then subtracted at 108 from the microphone signal to give the error signal $e_t$. The error signal $e_t$ is then filtered by a Bayesian post-filter 112 to suppress the residual echo and is also taken as an input by the adaptive algorithm 110. The output $\hat{s}'_t$ of that post-filter 112 is transmitted to the far-end (by example, output from FIG. 1 to a transmitter Tx of the mobile telephony device of which FIG. 1 forms a part). In FIG. 1 the linear echo path estimate is denoted as $\hat{w}_{1,t}$ while the post-filter 112 operation is denoted as $\hat{w}_{2,t}$. In the description below the estimated echo path estimate is simply given as $\hat{w}_t$ and the post-filter is hereafter referenced as the Bayesian Post-filter, i.e., without a symbol.

The following prior art documents attempt to solve the problem of modeling the expansion coefficients of the non-linear mapping, and the acoustic echo path as unknown deterministic parameters.

Learning of the non-linearity via a pre-processor followed by conventional adaptive filtering is detailed by A. Stenger and W. Kellermann in a paper entitled: RLS-ADAPTED POLYNOMIAL FOR NONLINEAR ACOUSTIC ECHO CANCELLING (*Signal Processing*, vol. 80, pp. 1747-1760, September 2000.)

A non-linear processor for selectively removing or reducing residual echo signals from an acoustic echo canceller associated with a telephony terminal is explored in U.S. Pat. No. 6,282,286 by Gordon Reesor et al.

Predistortion equalization is explored by K. Shi, X. Ma, and G. T. Zhou, in a paper entitled: NONLINEAR ACOUSTIC ECHO CANCELLATION USING A PSEUDO-COHERENCE FUNCTION (*IEEE Trans. on Circuits and Systems* I, vol. 55, no. 9, pp. 2639-2649, November 2008.).

A method and system for non-linear echo suppression is detailed at U.S. Pat. No. 7,672,445 by Ming Zhang et al. to include an echo canceller unit, a non-linear echo detection unit, and a non-linear echo suppression unit.

"Nonlinear acoustic echo cancellation using adaptive orthogonalized power filters", ICASSP, 2005. By Fabian Kuech, Andreas Mitnacht and Walter Kellermann.

SUMMARY

The foregoing and other problems are overcome, and other advantages are realized, by the use of the exemplary embodiments of this invention.

In a first aspect thereof the exemplary embodiments of this invention provide a joint Bayesian estimator comprising:

a Multichannel Input Generator, which converts the sample based input signal $x_t$ into a DFT-domain multichannel signal $[X_{\tau,1}, \ldots X_{\tau,p}]$ using an expansion basis as noted immediately below, where p is the number of channels or the expansion order.

Basis selection/a basis selector, to decide the expansion basis for operating the Bayesian estimator on the basis of the error signal $E_\tau$.

at least one processor particularly adapted for

Estimation of posterior of the unknown states, which in case of the cascade system detailed below at FIG. 2 is the mean $\hat{W}_\tau$ and covariance $P_\tau$ of the echo path $W_\tau$ and the mean $\hat{a}_\tau$ and covariance $Q_\tau$ of the nonlinear coefficients $a_\tau$ (i.e., forming a part of a dual expectation-step 2E-Step), and in case of the multichannel system detailed below at FIG. 3 is the channel-wise mean W. and the multichannel covariance $\underline{P}_\tau$ of the compound quantity formed by merging together the echo path $W_\tau$ and the $i^{th}$ nonlinear coefficient $a_{\tau,i}$ (i.e., forming a part of a multichannel expectation-step or ME-Step).

Model parameter estimation, which estimates model parameters $\theta_\tau$ consisting of at least one noise covariance. Computation of model parameters is a function of the posterior of the unknown states, input signal $x_t$ and the microphone signal $y_t$.

Computation of Kalman gain factor(s) $K_\tau$ for optimal adaptation of the posterior of unknown states in the expectation steps i.e., 2E-Step and the ME-Step. The Kalman gain factor is conditioned on at least one of the model parameters $\theta_\tau$, the input signal $x_t$, and the estimated posterior of the unknown states.

Estimate of the echo signal $\hat{Y}_\tau$, which is computed out using the multichannel input signal $[X_{\tau,1}, \ldots X_{\tau,p}]$ and the adapted posterior.

Generation of the error signal $E_\tau$, which is carried out by subtracting the estimated echo signal $\hat{Y}_\tau$ from the DFT-domain microphone signal $Y_\tau$.

Suppression of residual echo, which is carried out by post-filtering the error signal $E_\tau$ using a weighting function $\psi_\tau$ that depends at least on the error signal $E_\tau$, the input signal $x_t$ and, directly or indirectly, on the adapted posterior of the unknown states.

an Output for outputting the filtered error signal $\hat{s}'_t$ for transmission to a far-end.

In a second aspect thereof the exemplary embodiments of this invention provide a method of operating a joint Bayesian estimator comprising: selecting, based on an error signal $E_\tau$, an expansion basis for operating the Bayesian estimator; and using the selected expansion basis for converting a sample based input signal $x_t$ into a frequency domain multichannel signal $[X_{\tau,1}, \ldots X_{\tau,p}]$, where p is a total number of channels or expansion order of the selected expansion basis. Further this method follows by estimating of posteriors of at least two unknown states; estimating model parameters $\theta_\tau$ of which there is at least one noise covariance, where the model parameters are estimated as a function of the estimated posteriors of the at least two unknown states, the input signal $x_t$ and a microphone signal $y_t$. Further in the method there is computed at least one Kalman gain factor $K_\tau$ for adapting the posteriors of the at least two unknown states, and this computation is in dependence on at least one of the estimated model parameters $\theta_\tau$, the input signal $x_t$, and the estimated posteriors of the at least two unknown states. Also in the method an acoustic echo signal $\hat{Y}_\tau$ is estimated from the multichannel input signal $[X_{\tau,1}, \ldots X_{\tau,p}]$ and the adapted posteriors of the at least two unknown states; and the error signal $E_\tau$ is generated by subtracting the estimated echo signal $\hat{Y}_\tau$ from a frequency-domain version $Y_\tau$ of the microphone signal $y_t$. Finally in this method residual echo is suppressed by filtering the error signal $E_\tau$ using a weighting function $\psi_\tau$ that depends at least on the error signal $E_\tau$, the input signal $x_t$ and directly or indirectly on the adapted posteriors of the unknown states; and the filtered error signals $\hat{s}'_t$ is output for transmission to a far-end.

In a third aspect thereof the exemplary embodiments of this invention provide a joint Bayesian estimator for suppressing acoustic echo comprising at least one processor and at least one memory storing computer program instructions. In this embodiment the at least one memory and the computer program instructions are configured with the at least one processor at least to:

estimate a model parameter set $\theta_\tau$ comprising at least one noise covariance $\Psi_\tau$ as a function of at least an estimated or a predicted posterior of at least one unknown state quantity, a far-end signal $x_t$ and an error signal $E_\tau$;

generate a Kalman gain factor $K_\tau$ in dependence on the at least one noise covariance $\Psi_\tau$;

adapt the posterior of the at least one unknown state quantity using the Kalman gain factor $K_\tau$;

estimate the acoustic echo signal $\hat{Y}_\tau$ using the adapted posterior of the at least one unknown quantity;

subtract the estimated echo signal $\hat{Y}_\tau$ from a microphone signal $Y_\tau$ to generate an error signal $E_\tau$;

filter the error signal $E_\tau$ to suppress residual linear and nonlinear error according to a weighting function $\psi_\tau$ which depends on the error signal $E_\tau$, the far-end signal $x_t$ and the estimated posterior of the at least one unknown state quantity; and output the filtered error signal $\hat{s}'_t$ for transmission to a far-end.

In a fourth aspect thereof the exemplary embodiments of this invention provide a method of operating a joint Bayesian estimator comprising:

estimating a model parameter set $\theta_\tau$ comprising at least one noise covariance $\Psi_\tau$ as a function of at least an estimated or a predicted posterior of at least one unknown state quantity, a far-end signal $x_t$ and an error signal $E_\tau$;

generating a Kalman gain factor $K_\tau$ in dependence on the at least one noise covariance $\Psi_\tau$;

using the Kalman gain factor $K_\tau$ to adapt the posterior of at least one unknown state quantity;

estimating an acoustic echo signal $\hat{Y}_\tau$ using the adapted posterior of the at least one unknown state quantity;

subtracting the estimated acoustic echo signal $\hat{Y}_\tau$ from a microphone signal $Y_\tau$ to generate an error signal $E_\tau$;

filtering the error signal $E_\tau$ to suppress residual linear and nonlinear error according to a weighting function $\psi_\tau$ which depends on the error signal $E\tau$, the far-end signal $x_t$ and the adapted posterior of the at least one unknown state quantity; and outputting the filtered error signal $\hat{s}'_t$ for transmission to a far-end.

BRIEF DESCRIPTION OF THE DRAWINGS

FIG. 2C is a listing of exemplary equations used by various of the functional blocks of FIG. 2 to perform their operations and achieve their outputs.

FIG. 2D is a listing of terms used in the FIG. 2C equations and in the description of FIG. 2.

FIG. 3B is a listing of exemplary equations used by various of the functional blocks of FIG. 3 to perform their operations and achieve their outputs, with different equations presented for both block-diagonal BD and fully diagonal FD implementations of FIG. 3.

FIG. 3C is a listing of terms used in the FIG. 3B equations and in the description of FIG. 3.

DETAILED DESCRIPTION

Figure 2:
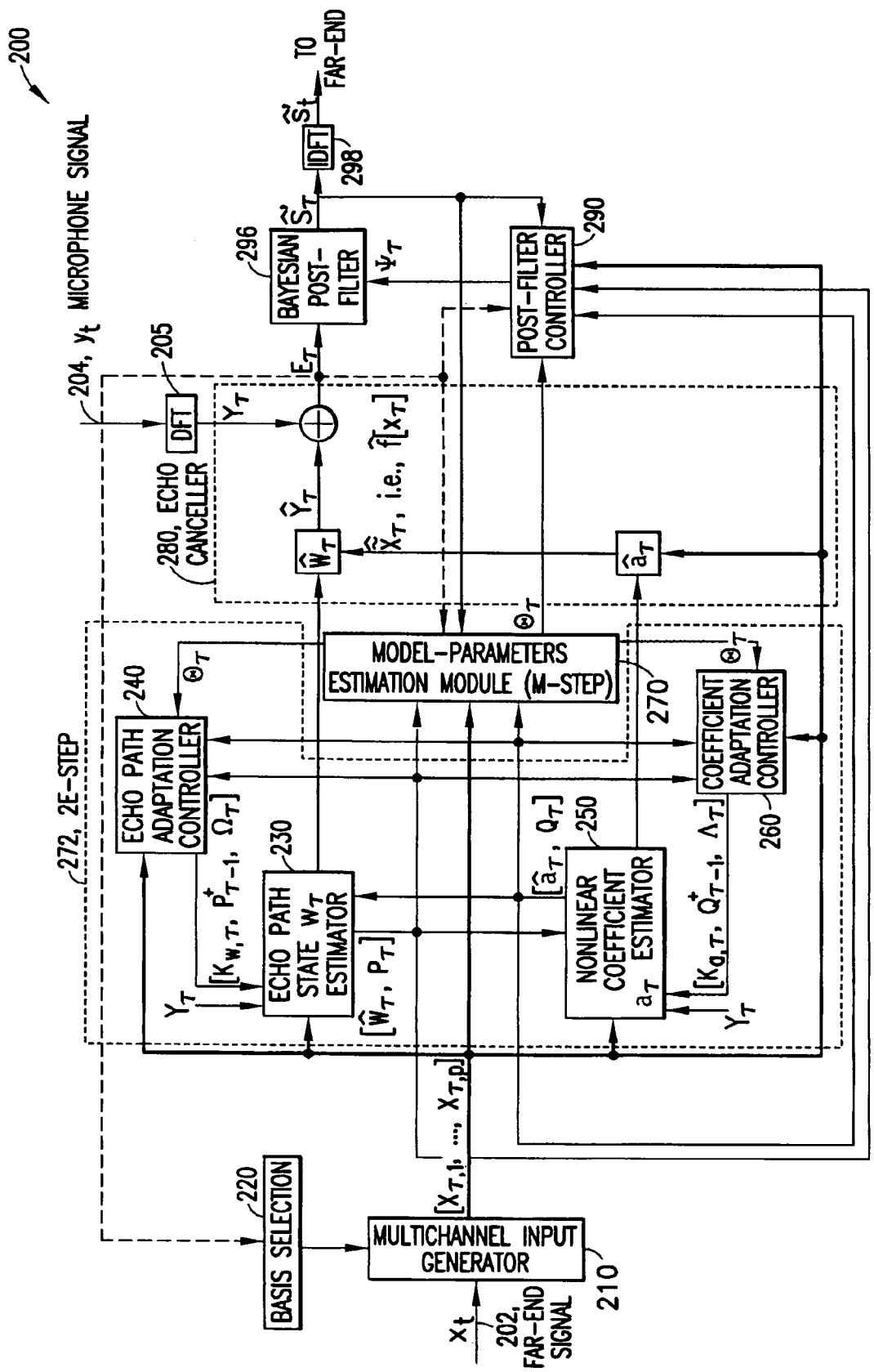
FIG. 2 is a schematic block diagram of an acoustic echo control system according to one exemplary embodiment of the invention employing a cascade system termed herein as a Variational Bayesian State-Space Frequency-Domain Adaptive Filter VBSSFDAF.
Figure 3:
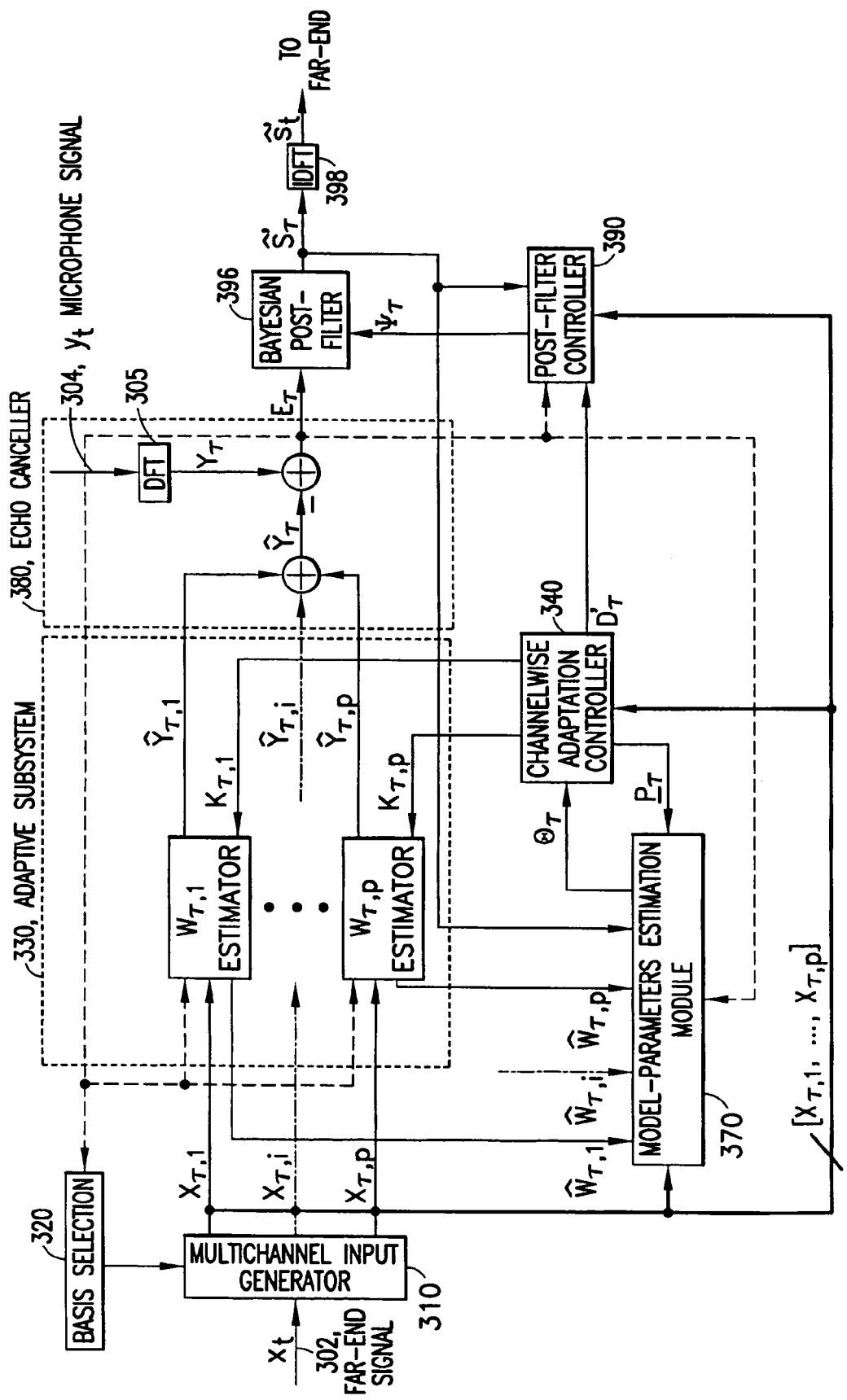
FIG. 3 is a schematic block diagram of an acoustic echo control system according to another exemplary embodiment of the invention employing a multichannel system termed herein as a Multichannel State-Space Frequency-Domain Adaptive Filter MCSSFDAF.

The above non-linearity problems are mitigated or fully resolved by exemplary embodiments of the invention such as the echo cancellation engine shown schematically at FIGS. 2 and 3. While both FIGS. 2 and 3 represent a Bayesian joint estimator, the cascade embodiment represented by FIG. 2 is referred to herein as a Variational Bayesian State-Space Frequency-Domain Adaptive Filter VBSSFDAF while the multichannel embodiment represented by FIG. 3 is referred to herein as a Multichannel State-Space Frequency-Domain Adaptive Filter MCSSFDAF. Before describing those embodiments in detail, first are outlined some features of them which are not seen in any conventional echo cancellation techniques known to the inventors.

Specifically, non-linear echo cancellation according to the exemplary embodiments detailed herein at FIG. 2 model the non-linear coefficients as well as the unknown echo path as random variables, with a first-order Markov property. This Markov modeling provides inherent smoothness and robustness in the estimation process. The FIG. 2 echo cancellation system based on Markov modeling adaptively learns the time-varying non-linearity and the echo path state to fit the observation. FIG. 2 shows that the non-linear coefficient estimator, which models the time varying non-linearity, and the echo path estimator are mutually interdependent; each providing outputs which are inputs to the other. In this manner it is an iterative variational Bayesian joint estimator, with all subsystems falling out of a contained derivation. The FIG. 3 echo cancellation system based on Markov modeling adaptively learns a multichannel compound quantity, formed after combining the time-varying non-linearity and the echo path state. Each channel of the compound quantity is termed for simplicity as the echo path per channel. FIG. 3 shows that the echo path per channel is learned using channel specific Kalman adaptation parameter. In this manner it is a recursive multichannel Bayesian joint estimator, with all subsystems falling out of a contained derivation.

It will be further seen that each of the iterative posterior estimators at both FIG. 2 and FIG. 3 (non-linear coefficient estimator and the echo path estimator in FIG. 2; adaptive subsystem at FIG. 3) manifests itself as an adaptive gradient based structure, and these are optimized by controlling the adaptation step size. The learning of the posterior implies the estimation of the mean and the error covariance of the estimated quantity. There is in an exemplary embodiment a formulation for maximizing expectations which inherently guarantees the stability of the overall system. And finally the system in FIG. 2 and FIG. 3 has an in-built capacity for non-linearity detection and for evaluating the model it implements in any given instance.

Each of these is seen to be a separate and distinct point of novelty, and so the overall system as detailed with respect to FIGS. 2 and 3 are a bit of a departure from conventional echo cancellation techniques.

Figure 5:
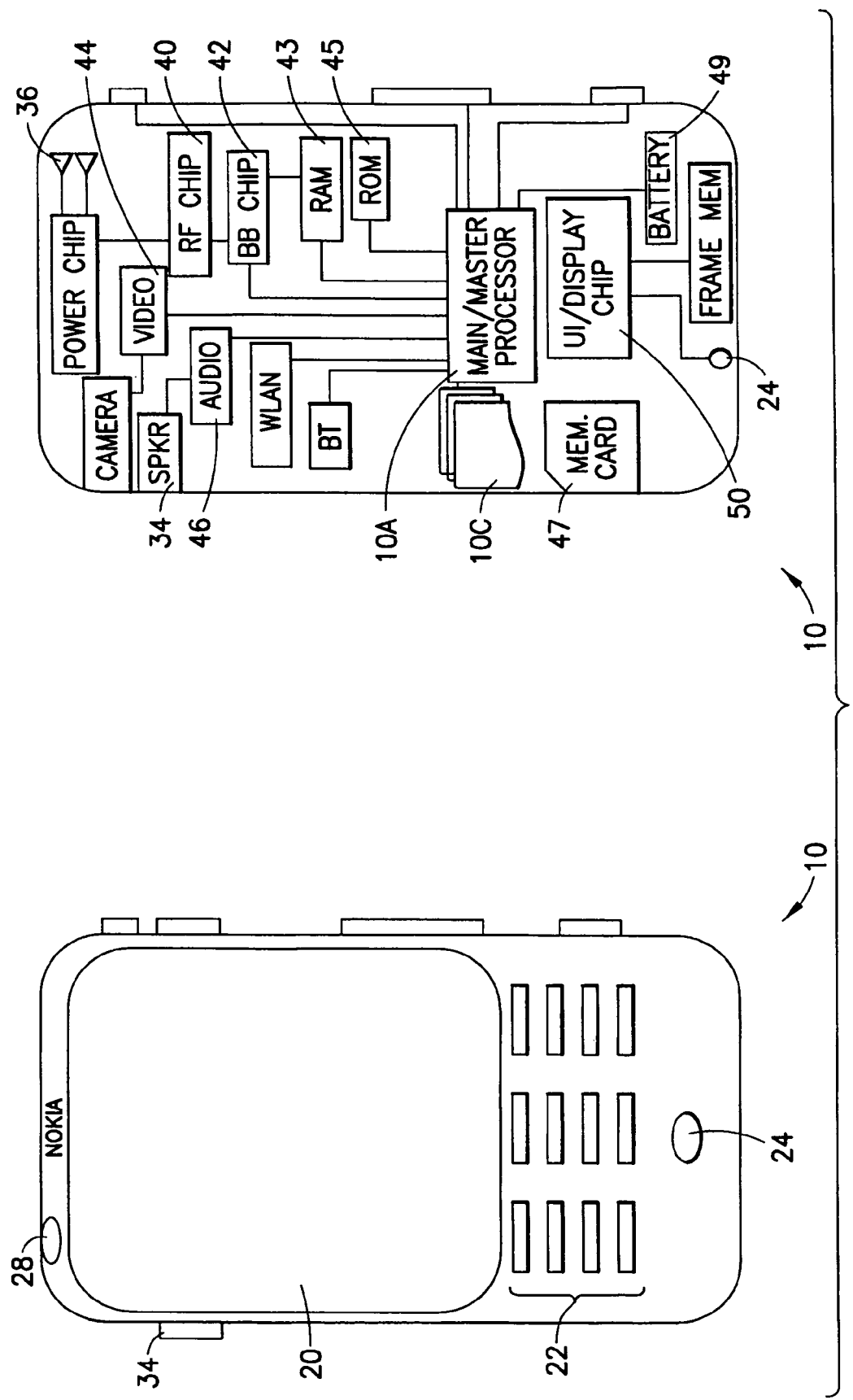
FIG. 5 shows a particularized block diagram of a host device (mobile terminal) as exemplary of a host device in which the joint Bayesian estimator according to these teachings may be disposed.

The echo cancellation engine of FIG. 2 or 3 may be implemented as software (including firmware) embodied on a computer readable memory, as hardware, or as a combination of hardware and software. The physical arrangement of the loudspeaker and microphone may be as generally shown at FIG. 1 or FIG. 5, with the far-end signal $x_t$ being wirelessly received at the host device and input to the loudspeaker for transducing to an acoustic signal and the microphone signal $y_t$ being output from the microphone after being transduced from an acoustic signal.

The host device/mobile telephony device need not include both the loudspeaker and the microphone, as the echo cancellation engines of FIGS. 2 and 3 will also prove advantageous for the case in which the far-end signal $x_t$ is wirelessly sent via Bluetooth or similar short-range technology (shown by example at FIG. 5) to an automobile-mounted radio or similar remote speaker and never output from the host device's own loudspeaker.

Now consider in particular the specific but non-limiting VBSSFDAF embodiment of FIG. 2. Five major components of the echo cancellation engine 200 embody the majority of the above-noted novel features. There is an echo path estimator 230 which in conjunction with an echo path adaptation controller 240 estimates the echo path between loudspeaker and microphone. There is a non-linear coefficient estimator 250 which in conjunction with a coefficient adaptation controller 260 estimates parameters to account for non-linearity in the microphone signal $y_t$ by means of the mutual interdependence between the echo path estimator 230 and the non-linear coefficient estimator 250. And there is a model parameter estimator 270 which provides certain parameters to the two other estimators 230, 250 via their corresponding controllers 240, 260 as detailed below.

Figure 1:
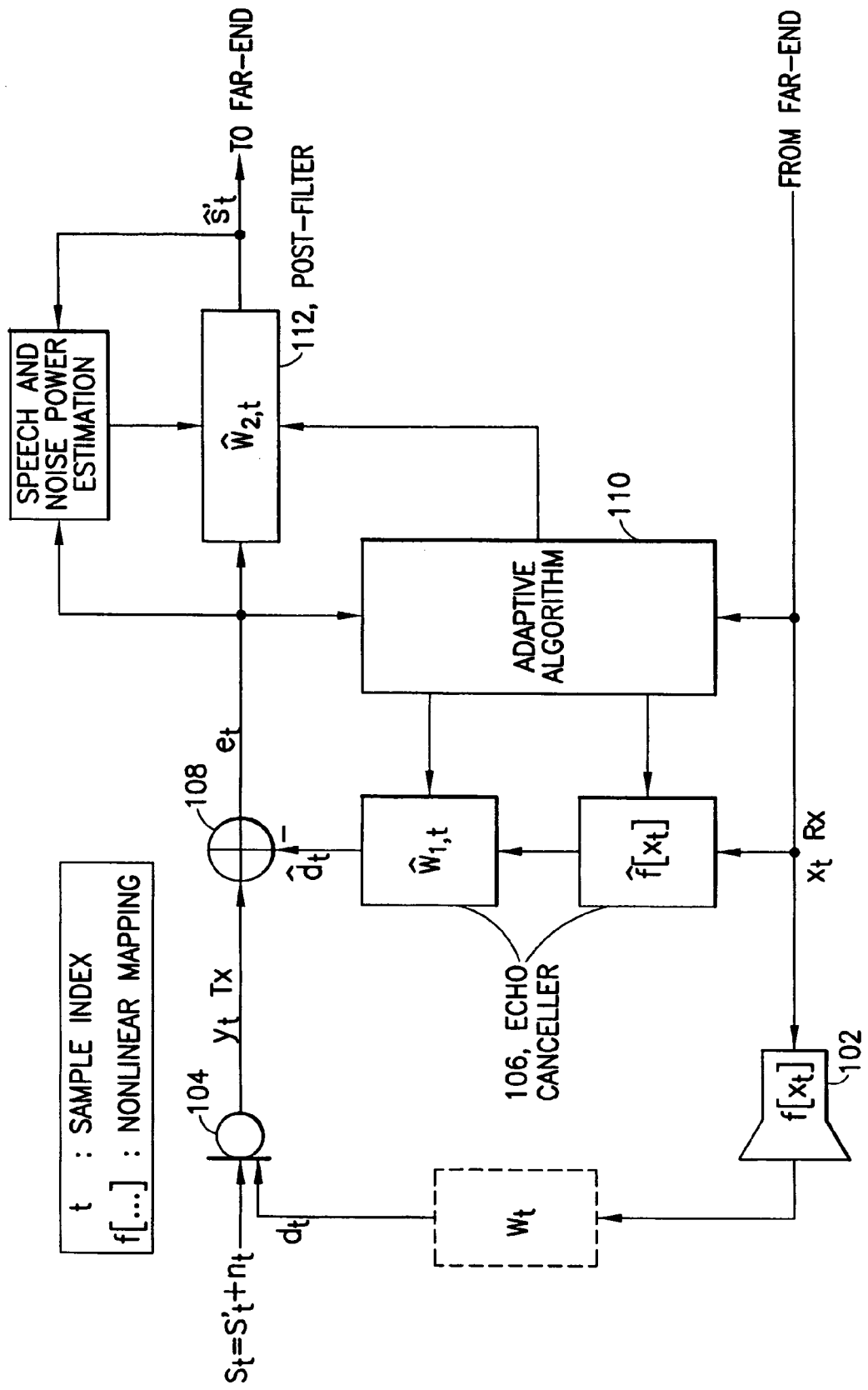
FIG. 1 is an exemplary rendition of an echo control system within a mobile telephony device as may be adapted with a Bayesian Post-filter according to these teachings.

The two external inputs to the echo cancellation engine 200 are the same as in FIG. 1: the far-end signal $x_t$ 202 and the microphone signal $y_t$ 204. FIG. 2 uses the following notation: a hat â indicates an estimated quantity: τ indicates a block time index; subscript t indicates a time-sample index; a capital letter indicates a Discrete Fourier Transform DFT quantity; a tilde ã indicates a quantity with non-linear coefficients absorbed; and a superscript + indicates a prediction term.

At FIG. 2 there is a multichannel input generator 210 which takes as inputs the sample-based far-end signal $x_t$ and a decision from a basis selection module 220 (e.g., a truncated odd Fourier Series or a truncated odd Power Series). The multichannel input generator 210 converts the sample based far-end input signal $x_t$ to a block-based signal according to the decision input from the basis selection subsystem 220 and also converts the equivalent multichannel block-based signal to DFT-domain multichannel input signal $[X_{\tau,1}, \ldots X_{\tau,p}]$. This is a DFT-domain quantity, in which the index p indicates the expansion order selected by the basis selection module 220. Thus $X_{i,\tau}$ is termed the nonlinearly mapped input signal in the DFT-domain of the $i^{th}$ expansion order. Subsystems receiving this multichannel input signal $[X_{\tau,1}, \ldots X_{\tau,p}]$ from the multichannel input generator 210 are the echo path state estimator 230, the echo path adaptation controller 240, the nonlinear coefficient estimator 250, the coefficient adaptation controller 260, the model parameter estimation module 270, the echo canceller 280 and the post-filter controller 290 as shown at FIG. 2.

The basis selection module 220 takes as inputs the DFT-domain error signal $E_\tau$ from the echo canceller 280 and makes a binary decision, which one of the two possible basis function expansions (truncated odd Fourier or odd Power series) will be used to operate the VBSSFDAF. This block 220 may in some embodiments also include a sophisticated decision making process using a convex combination methodology. The output of the basis selection module 220 is that binary decision.

One input to the echo path state estimator 230 is a block-based DFT-domain microphone signal $Y_\tau$. This DFT-domain microphone signal $Y_\tau$ is input from the echo canceller 280, and specifically is output from a DFT block 205 which converts the time-sampled microphone signal $y_t$ to the frequency domain. For clarity of the drawing the path along which $Y_\tau$ is passed from the echo canceller 280 to the echo path state estimator 230 is not specifically shown at FIG. 2 but implied. Further inputs to the echo path state estimator 230 include: an equivalent multichannel far-end signal $[X_{\tau,1}, \ldots X_{\tau,p}]$ which is output by the multichannel input generator 210; an echo path Kalman-gain $K_{\omega,\tau}$ which is output from the echo path adaptation controller 240; a predicted echo path state-error covariance $P_{\tau-1}^+$ which is also output from the echo path adaptation controller 240; an echo path assimilation term $\Omega_\tau$ which is additionally output from the echo path adaptation controller 240; and a posterior estimate on the nonlinear expansion coefficients $a_\tau$ which is shown at FIG. 2 as the estimated mean $\hat{a}_\tau$ and the estimated error covariance $Q_\tau$ of the nonlinear expansion coefficients $a_\tau$. This posterior estimate on $a_\tau$ is output from the nonlinear coefficient estimator 250.

Figure 2A:
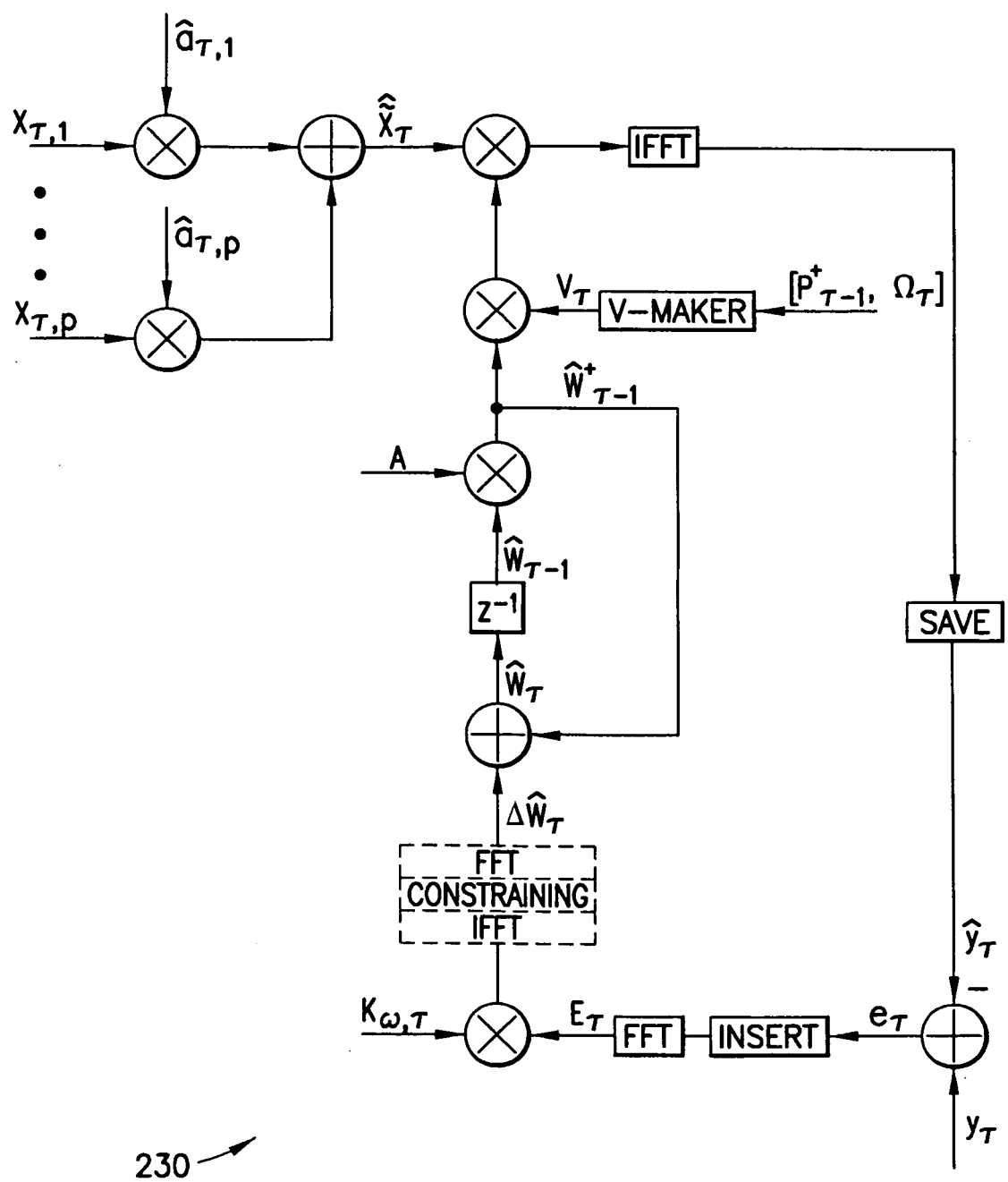
FIG. 2A is a detailed embodiment of the echo path state estimator shown in block form at FIG. 2.

One non-limiting embodiment of the echo path state estimator 230 is shown in digital signal processing structure at FIG. 2A. The echo path state estimator 230 operates to compute the prediction mean $\hat{W}_{\tau-1}^+$ for the echo path state $W_\tau$ that is described by Equation (1) of FIG. 2C; and makes use of the estimated mean of the nonlinear coefficients $\hat{a}_\tau$ to execute the second part of equation (3) of FIG. 2C (after the semicolon) to compute the estimated nonlinearly mapped far-end input signal $\hat{X}_\tau$ in the DFT-domain. The echo path state estimator 230 also uses the echo path assimilation term $\Omega_\tau$, which facilitates the propagation of the reliability measure of the nonlinear coefficient estimate, and the echo path predicted error covariance $P_{\tau-1}^+$ (equation 4 of FIG. 2C) to compute the echo path update factor $V_\tau$ (equation 6 of FIG. 2C) which provides for the necessary intercoupling within the variational Bayesian system 200 to carry out an optimal update of the estimated state $\hat{W}_\tau$. In FIG. 2A this functionality is illustrated as the "V-Maker". The echo path state estimator 230 also employs the microphone signal $Y_\tau$, the echo path update factor $V_\tau$ and the predicted state $\hat{W}_{\tau-1}^+$ to arrive at the latest estimate of the echo path mean $\hat{W}_\tau$. The echo path update is regulated via an overlap-save constraint and the optimum adaptation parameter, the echo path Kalman-gain $K_{\omega,\tau}$ and the factor $V_\tau$, as described at equation (7) of FIG. 2C. This optimum adaptation allows for near-optimal tracking and remarkable robustness in the presence of varying echo path and adverse observation noise. Another function of the echo path state estimator 230 is to compute the current estimate of the echo path error covariance $P_\tau$ to conclude the intercoupled estimation of the echo path posterior, as detailed at equation (8) of FIG. 2C. With a direct feed of the microphone signal $Y_\tau$, the echo path state estimator 230 subsystem works with its own internal error signal.

As can be seen at FIG. 2 and from the above description, the echo path state estimator 230 outputs the estimated mean of the echo path state $\hat{W}_\tau$ (a DFT domain quantity) to the echo canceller 280; injects the estimated posterior on the echo path $W_\tau$ (which comprises the estimated echo path mean $\hat{W}_\tau$ and the echo path state-error covariance $P_\tau$) into the nonlinear coefficient estimator 250; and injects the estimated posterior on the echo path $W_\tau$ into the post-filter controller 290 and into the echo path adaptation controller 240, and also to the model-parameter estimation module (M-Step) 270 and to the coefficient adaptation controller 260.

The echo path adaptation controller 240 takes an input of the equivalent multichannel far-end signal $[X_{\tau,1}, \ldots X_{\tau,p}]$ from the multichannel input generator 210; and an input of the posterior estimate on the nonlinear expansion coefficients $a_\tau$ (comprising the estimated mean $\hat{a}_\tau$ and the estimated error covariance $Q_\tau$) from the nonlinear coefficient estimator 250. Further inputs to echo path adaptation controller 240 include the posterior estimate on the echo path state $W_\tau$ (comprising the estimated echo path mean $\hat{W}_\tau$ and the echo path state-error covariance $P_\tau$) from the echo path state estimator 230; and model parameters $\theta_\tau$ from the model parameter estimation module 270. These model parameters $\theta_\tau$ include a) process noise covariance for the echo path state $\Psi_\tau^\Delta$, b) process noise covariance for nonlinear expansion coefficients $\Psi_\tau^a$, and observation noise covariance $\Psi_\tau^s$. But note that of those three the echo path adaptation controller 240 utilizes only $\Psi_\tau^\Delta$ and $\Psi_\tau^s$ via equations (2) and (3) of FIG. 2C.

The echo path adaptation controller 240 executes equation (2) to compute the predicted echo path state-error covariance $P_{\tau-1}^+$, using the process noise covariance for the echo path state $\Psi_\tau^\Delta$, as well as the echo path state transition coefficient "A". The echo path adaptation controller 240 executes both portions of equation (3) to generate the estimated nonlinearly mapped input signal $\hat{X}_\tau$ in the DFT-domain, and the important echo path assimilation term $\Omega_\tau$ which provides a way to accommodate the reliability measure on the nonlinear coefficient estimation into the echo path state adaptation. The echo path assimilation term $\Omega_\tau$ is computed using the multichannel DFT-domain input signal $[X_{\tau,1}, \ldots X_{\tau,p}]$, error covariance $Q_\tau$ of the nonlinear expansion coefficients $a_\tau$, and the observation noise covariance $\Psi_\tau^s$. Utilizing equation (4) of FIG. 2C, the echo path adaptation controller 240 uses the assimilation term $\Omega_\tau$ to compute the modified predicted echo path state error covariance $\tilde{P}_{\tau-1}^+$ which is used to bring about optimal adaptation control. Finally, the echo path adaptation controller 240 utilizes equation (5) of FIG. 2C to compute the echo path Kalman-gain parameter for optimal tracking and adaptation of the echo path state and covariance update in the echo path state estimator 230. While it may appear that there would be a duplication of equations (3) and (4) at both the echo path state estimator 230 and at the echo path adaptation controller 240, in a practical system this is easily avoided; the apparent duplication results from the functional description of simple and discrete functional blocks which in a practical system may be a bit more intertwined.

The outputs of the echo path adaptation controller 240 are then the echo path Kalman-gain $K_{\omega,\tau}$; the predicted echo path state-error covariance $P_{\tau-1}^+$; and the echo path assimilation term $\Omega_\tau$. All of these are output to the echo path state estimator 230.

The nonlinear coefficient estimator 250 takes six inputs. From the echo canceller 280 is input the block-based DFT-domain microphone signal $Y_\tau$ (path from echo canceller 280 is not shown at FIG. 2); from the multichannel input generator 210 is input the equivalent multichannel far-end signal $[X_{\tau,1}, \ldots X_{\tau,p}]$; from the coefficient adaptation controller 260 is input the nonlinear coefficient Kalman-gain $K_{a,\tau}$ and the predicted nonlinear coefficients error covariance $Q_{\tau-1}^+$ and also the nonlinear coefficient assimilation term $\Lambda_\tau$; and from the echo path state estimator 230 is input the posterior estimate on the echo path state $W_\tau$ which as above comprises the estimated echo path mean $\hat{W}_\tau$ and the estimated error covariance $P_\tau$ of the echo path state.

Figure 2B:
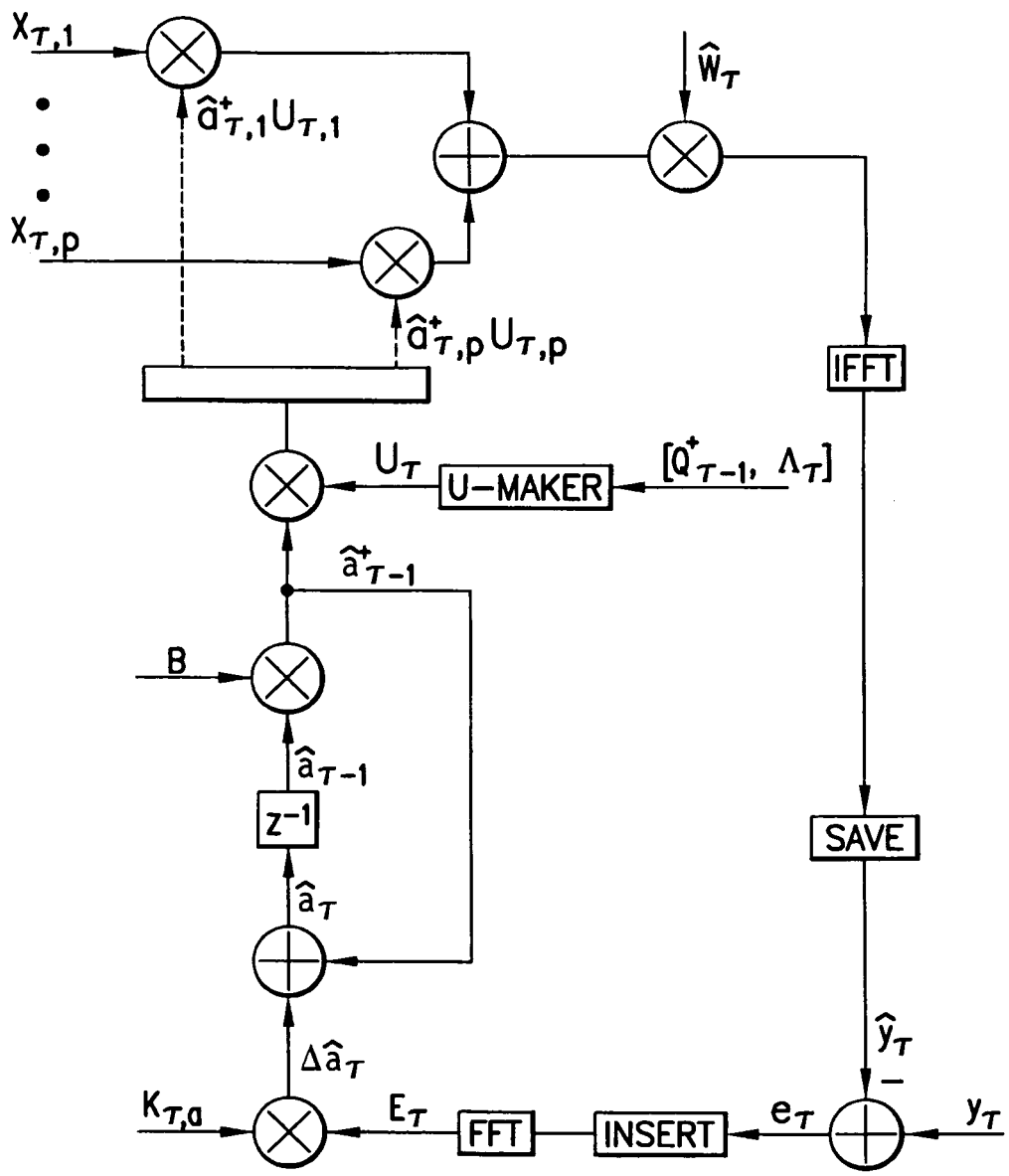
FIG. 2B is a detailed embodiment of the nonlinear coefficient estimator shown in block form at FIG. 2.

One non-limiting embodiment of the nonlinear coefficient estimator 250 is shown in digital signal processing structure at FIG. 2B. The nonlinear coefficient estimator 250 operates to compute the prediction mean $\hat{a}_{\tau-1}^+$ for the nonlinear coefficients $a_\tau$ as is shown at equation (9) of FIG. 2C. The nonlinear coefficient estimator 250 also uses the nonlinear coefficient assimilation term $\Lambda_\tau$ (which facilitates the propagation of the reliability measure of the echo path state estimate) and the echo path predicted error covariance $Q_{\tau-1}^+$ to compute the nonlinear coefficient update factor $U_\tau$ using equations (12) and (15) of FIG. 2C, which provides for the necessary intercoupling within the variational Bayesian system 200 to carry out an optimal update of the estimated coefficients $\hat{a}_\tau$. This operation is shown as the "U-Maker" in FIG. 2B.

The nonlinear coefficient estimator 250 further employs the microphone signal $Y_\tau$, the nonlinear coefficient update factor $U_\tau$ and the predicted nonlinear coefficients $\hat{a}_{\tau-1}^+$ to arrive at the latest estimate of the nonlinear coefficients mean $\hat{a}_\tau$. The update, which uses an overlap-save constraint, is regulated by the optimum adaptation parameter, the nonlinear coefficients Kalman gain $K_{a,\tau}$, as shown at equation 16) of FIG. 2C. This optimum adaptation allows for near-optimal tracking and remarkable robustness in the presence of varying nonlinearity and adverse observation noise. The nonlinear coefficient estimator 250 also computes the current estimate of the nonlinear coefficients error covariance $Q_\tau$ to conclude the intercoupled estimation of the nonlinear coefficients posterior as shown by equation 17) of FIG. 2C. Like the echo path state estimator 230, the nonlinear coefficient estimator 250 has a direct feed of the microphone signal $Y_\tau$ and so also works with its own internal error signal.

Using the above processes the nonlinear coefficient estimator 250 supplies the estimated mean of the nonlinear coefficients $\hat{a}_\tau$ to the echo canceller 280; and injects the estimated posterior on the nonlinear coefficients $a_\tau$ (comprising the estimated mean $\hat{a}_\tau$ and the nonlinear coefficient error covariance $Q_\tau$) into the echo path state estimator 230, into the post-filter controller 290, and into the coefficient adaptation controller 260. and also to the model-parameter estimation module (M-Step) 270 and to the echo path adaptation controller 240.

The following are input to the coefficients adaptation controller 260. The multichannel far-end signal $[X_{\tau,1}, \ldots X_{\tau,p}]$ is input from the multichannel input generator 210. The posterior estimate on the nonlinear expansion coefficients $a_\tau$ (comprising the estimated mean $\hat{a}_\tau$ and the estimated error covariance $Q_\tau$ of the covariance nonlinear expansion coefficients $a_\tau$) is input from the nonlinear coefficient estimator 250. The posterior estimate on the echo path $W_\tau$ (comprising the estimated mean $\hat{W}_\tau$ and the estimated error covariance $P_\tau$) is obtained from the echo path state estimator 230. The model parameters $\theta_\tau$ (comprising the process noise covariance for the echo path state $\Psi_\tau^\Delta$, the process noise covariance for nonlinear expansion coefficients $\Psi_\tau^a$, and the observation noise covariance $\Psi_\tau^s$) is obtained from the model parameter estimation module 270. Of these three model parameters $\theta_\tau$, the coefficients adaptation controller utilizes only $\Psi_\tau^a$ and $\Psi_\tau^s$.

The coefficients adaptation controller 260 executes equation (10) of FIG. 2C to compute the predicted nonlinear coefficients error covariance $Q_{\tau-1}^+$ using the process noise covariance for the nonlinear coefficients $\Psi_\tau^a$ and the nonlinear coefficients transition coefficient "B". It also executes equation (11) of FIG. 2C to generate the nonlinear coefficients assimilation term $\Lambda_\tau$ which provides a way to accommodate the reliability measure on the echo path estimation into the nonlinear coefficients adaptation. The term $\Lambda_\tau$ is computed using the multichannel DFT-domain input signal $[X_{\tau,1}, \ldots, X_{\tau,p}]$, the error covariance $P_\tau$ of the echo path state and the observation noise covariance $\Psi_\tau^s$. The assimilation term $\Lambda_\tau$ is then used, as shown in equation (12) of FIG. 2C, to compute the modified predicted nonlinear coefficients error covariance $\tilde{Q}_{\tau-1}^+$ for bringing about optimal adaptation control. Finally, the coefficients adaptation controller 260 computes (see equation 14 of FIG. 2C) the nonlinear coefficients Kalman-gain parameter $K_{a,\tau}$ for optimal tracking and adaptation of the nonlinear coefficients mean and covariance update in the nonlinear coefficients estimator 250. It may also appear here that equation (12) would be duplicated in both the nonlinear coefficients estimator 250 and the coefficients adaptation controller 260, but this is to simplify the illustration at FIG. 2 (and FIG. 3) and in practical systems such duplication need not be the case.

The coefficients adaptation controller 260 then outputs the echo path Kalman-gain $K_{a,\tau}$ to the nonlinear coefficient estimator 250, and outputs the predicted nonlinear coefficients error covariance $Q_{\tau-1}^+$ as well as the echo path assimilation term $\Lambda_\tau$ to the nonlinear coefficient estimator 250.

Together, the nonlinear coefficient estimator 250, the coefficients adaptation controller 260, the echo path state estimator 230, and the echo path adaptation controller 240 collectively form a dual expectation-step (2E-Step) 272.

The VBSSFDAF embodiment of FIG. 2 further includes the model parameter estimation module 270, which takes as inputs: the equivalent multichannel far-end signal $[X_{\tau,1}, \ldots, X_{\tau,p}]$ from the multichannel input generator 210; the posterior estimate on the nonlinear expansion coefficients $a_\tau$ (comprising the estimated mean $\hat{a}_\tau$ and the estimated error covariance $Q_\tau$ of the covariance nonlinear expansion coefficients $a_\tau$) from the nonlinear coefficient estimator 250; and also the posterior estimate on the echo path $W_\tau$ (comprising the estimated mean $\hat{W}_\tau$ and the estimated error covariance $P_\tau$) is obtained from the echo path state estimator 230. There are two further inputs to the model parameter estimation module 270: the DFT-domain error signal $E_\tau$ from the echo canceller 280; and the DFT-domain output $S'_\tau$ of the Bayesian Post-filter 296, which after inverse DFT (IDFT) processing at block 298 is the time domain signal $\hat{s}'_t$ to be transmitted to the far-end.

The model parameter estimation module 270 executes the maximum likelihood learning rules to compute the model parameter set $\theta_\tau$, which as detailed above include the process noise covariance for the echo path state $\Psi_\tau^\Delta$, the process noise covariance for nonlinear expansion coefficients $\Psi_\tau^a$, and the observation noise covariance $\Psi_\tau^s$. The model parameter estimation module 270 outputs this model parameter set $\theta_\tau$ to the post-filter controller 290, the echo path adaptation controller 240, and to the coefficient adaptation controller 260.

Naming the function of the model parameter estimating module 270 as the model parameter maximization or M-step, then together with the 2E dual expectation step 272 they form a 2EM subsystem.

The echo canceller 280 gets four inputs: the equivalent multichannel far-end signal $[X_{\tau,1}, \ldots X_{\tau,p}]$ from the multichannel input generator 210; the estimated mean $\hat{a}_\tau$ of the nonlinear coefficients from the nonlinear coefficients estimator 250; the estimated mean $\hat{W}_\tau$ of the echo path state from the echo path state estimator 230; and the DFT-domain microphone signal $Y_\tau$ from the DFT block 205.

The echo canceller 280 computes the estimated nonlinearly mapped input signal from far-end in the DFT-domain $\hat{\tilde{X}}_\tau$ using the estimated nonlinear coefficients $\hat{a}_\tau$; convolves the estimated nonlinearly mapped input signal from the far-end $\hat{\tilde{X}}_\tau$ with the estimated echo path mean $\hat{W}_\tau$; implements the overlap-save constraint to linearize that convolution and output the estimated echo signal $\hat{Y}_\tau$; and finally subtracts the estimated echo signal $\hat{Y}_\tau$ from the microphone signal $Y_\tau$ to compute the error signal $E_\tau$. The computed error signal $E_\tau$ contains the near speech and noise, which after post-filtering (not a part of the echo canceller 280 subsystem) and conversion to the time domain is transmitted to the far-end.

The echo canceller 280 outputs the DFT-Domain error signal $E_\tau$ to four modules at FIG. 2: the Bayesian Post-filter 296, its controller 290, the model parameter estimation module 270, and the basis selection module 220.

The post-filter controller 290 receives the equivalent multichannel far-end signal $[X_{\tau,1}, \ldots X_{\tau,p}]$ from the multichannel input generator 210; receives the posterior estimate on the nonlinear expansion coefficients (comprising the estimated mean $\hat{a}_\tau$ and the estimated error covariance $Q_\tau$ of the covariance nonlinear expansion coefficients $a_\tau$) from the nonlinear coefficient estimator 250; receives the posterior estimate on the echo path $W_\tau$ (comprising the estimated mean $\hat{W}_\tau$ and the estimated error covariance $P_\tau$ of the echo path state $W_\tau$) from the echo path state estimator 230; and further receives the model parameter set $\theta_\tau$ (including $\Psi_\tau^\Delta$, $\Psi_\tau^a$, and $\Psi_\tau^s$ as detailed above) from the model parameter estimation module 270. While the whole set $\theta_\tau$ is input to it, the Bayesian Post filter controller uses only the observation noise covariance $\Psi_\tau^s$. The post-filter controller 290 also receives the DFT-domain error signal $E_\tau$ from the echo canceller 280, and the DFT-domain output $\hat{S}'_\tau$ of the Bayesian post-filter 296, which after the IDFT 298 becomes the time domain signal $\hat{s}'_t$ to be transmitted to the far-end.

The post-filter controller 290 infers the residual echo path state estimation error, infers the residual nonlinear coefficients estimation error, computes total estimation error including the error due to observation noise, and outputs an optimal weighting function $\psi_\tau$ for the suppression of residual linear and nonlinear echo in the error signal $E_\tau$. This DFT-domain weighting function $\psi_\tau$ is output to the Bayesian post-filter 296.

The final subsystem of the VBSSFDAF embodiment of FIG. 2 is the Bayesian post-filter 296. To it is input the DFT-domain error signal $E_\tau$ from the echo canceller 280, and also the DFT-domain weighting function $\psi_\tau$ from the post-filter controller 290. The Bayesian post-filter 296 operates to window (or pseudo-window) the input signals to execute a credible overlap-add or overlap-save convolution in the DFT-domain, filtering of the error signal $E_\tau$ to suppress residual linear and nonlinear echo and also in some embodiments to provide a basis for noise reduction. Further, the Bayesian post-filter 296 operates to output the DFT-domain signal $\hat{S}'_\tau$ which FIG. 2 shows is converted to a time-domain sample-based form if required prior to transmission back to the far-end.

The Variational Bayesian State-Space Frequency-Domain Adaptive Filter VBSSFDAF, of which FIG. 2 illustrates a particular embodiment, provides the following technical effects and advantages. First, the unknown quantities are modeled as random variables, which enables the full posteriors to be inferred. In effect this is an estimation over probability mass rather than over point estimates, and this is one reason the VBSSDAF is so much more robust in the presence of outliers and variations than earlier approaches. Second, the optimization criterion is the evidence distribution, which in fact is the only known truth. Thus the optimization criterion is also data adaptive to the core, making the algorithm suitable for non-stationary environments as well. Third, that the derivation is contained within the variational Bayesian framework allows for concrete mathematical statements about robustness, stability and convergence characteristics of the algorithm. Fourth, it is also possible to embed all a priori and application-specific information within the Bayesian framework which allows the VBSSDAF engine to handle comprehensively the problem at hand. Moreover the system has a built-in model evaluation mechanism, which keeps updating the underlying model parameters. And finally, the post-filter is optimized and automatically driven as detailed above.

The VBSSFDAF embodiment also exhibits the following distinctions over other known estimators, each of which is seen to be a novel feature of this embodiment of the invention.

- Modeling of the nonlinear coefficients as well as the unknown echo path as random variables with first-order Markov property is not seen in the prior art. The Markov property provides inherent smoothness and robustness in the estimation process.
- The VBSSFDAF based on Markov modeling adaptively learns the time-varying nonlinearity and the echo path state to fit the observation or the evidence distribution.
- It is an iterative variational Bayesian joint estimator with all subsystems falling out of a contained derivation.
- Each of the iterative posterior estimators manifests itself as an adaptive gradient based structure with optimal adaptation control.
- The expectation maximization, i.e., posterior estimation and the model parameter estimation, formulation inherently guarantees the stability of the overall system.
- The VBSSFDAF has the built in capacity for nonlinearity detection and model evaluation.
- Due to posterior estimation, rather than point estimates, it is possible to compute the joint estimation error. Together with model learning parameters, this joint estimation error is used to drive a Bayesian Post-filter stage for residual echo suppression, which is termed herein as the Bayesian Post-filter.

Now consider another embodiment of a joint Bayesian estimator, introduced above as a Multichannel State-Space Frequency-Domain Adaptive Filter MCSSFDAF and for which an exemplary but non-limiting embodiment of such an echo cancellation engine 300 is shown at FIG. 3. For purposes of explanation. there are eight functional subsystems at FIG. 3: a multichannel input generator 310; a basis selection module 320; an adaptive subsystem 330; a channelwise adaption controller 340; an echo canceller 380; a model parameters estimation module 370; a post-filter controller 390; and a Bayesian Post-filter 396. These are detailed below individually. External inputs to the echo cancellation engine 300 include the sample-based far-end signal 302 denoted as $x_t$ and the sample-based microphone signal 304 denoted as $y_t$; the output of this engine 300 is the time domain signal $ŝ'_t$ which is transmitted back to the far-end.

The multichannel input generator 310 receives as inputs the far-end sample-based input signal $x_t$ and also receives the binary decision from the basis selection module 320. It operates to block-form from the input samples and to generate a DFT-domain input for the $i^{th}$ channel $X_{\tau,i}$ according to the selected basis functions. The whole multichannel input signal is given by the concatenated matrix $[X_{\tau,1}, \ldots X_{\tau,p}]$ where p is the number of channels or the expansion order. The two possible basis functions employed at this stage are the odd orthogonal Fourier basis and the odd truncated Power series, depending on the decision received from the basis selection module 320. The multichannel input generator 310 then outputs $[X_{\tau,1}, \ldots X_{\tau,p}]$ which is the DFT-domain multichannel version of the sample-based input signal $x_t$. This DFT-domain multichannel signal $[X_{\tau,1}, \ldots X_{\tau,p}]$ is output to the adaptive subsystem 330, the model parameters estimation module 370, the channelwise adaptation controller 340, and the post-filter controller 390.

A DFT-domain error signal $E_\tau$ is input to the basis selection module 320 from the echo canceller 380, which makes the binary decision mentioned above on the basis of that error signal $E_\tau$ to operate the MCSSFDAF using one of the two possible basis functions (e.g., truncated odd Fourier or odd Power series expansion). Apart from the basis functions from which the decision selects, this is similar to the basis selection module 220 of FIG. 2, and like that of FIG. 2 may also contain a sophisticated data adaptive decision-directed process using a convex combination methodology. The basis selection module 320 of the MCSSFDAF embodiment of FIG. 3 then outputs its binary decision to the multichannel input generator 310.

The adaptive subsystem 330 receives the multichannel input signal $[X_{\tau,1}, \ldots X_{\tau,p}]$ from the multichannel input generator 310, and the DFT-domain error signal $E_\tau$ from the echo canceller 380, and also a channelwise Kalman gain parameter $[K_{\tau,1}, \ldots, K_{\tau,p}]$ from the channelwise adaptation controller 340. The adaptive subsystem 330 operates to compute the predicted mean $\hat{W}_{\tau-1,i}^+$ for the $i^{th}$ channel as described by equation (18) of FIG. 3B. The adaptive subsystem 330 also provides the latest estimate of the echo path $\hat{W}_{\tau,i}$ in each channel and computes the corresponding estimate of the echo signal $\hat{Y}_{\tau,i}$ in the $i^{th}$ channel. The term $\hat{W}_{\tau,i}$ is basically an estimate of a compound random variable with the nonlinear coefficients absorbed in it. For simplicity we have, and shall continue to, refer to it as the echo path in each channel. The computation of the channelwise estimated echo signal $\hat{Y}_{\tau,i}$ is implied within the execution of equation (22) of FIG. 3B although the common error signal $E_\tau$ is not yet computed at this stage. Internally, the latest estimate is acquired by adding the previous estimate to a gradient quantity computed as a function of the common error signal $E_\tau$ and the optimal channelwise Kalman gain parameter $K_{\tau,i}$. The channelwise adaptation parameter $K_{\tau,i}$ is provided by the channelwise adaptation controller 340, which enables optimal tracking and robustness against noise and variability. The latest update is acquired as shown by equation (23) of FIG. 3B. The adaptive subsystem 330 also implements the overlap save constraining to linearize the cyclic convolution in the DFT-domain. This linearization allows the DFT-domain estimated channelwise echo signal to be computed.

Figure 3A:
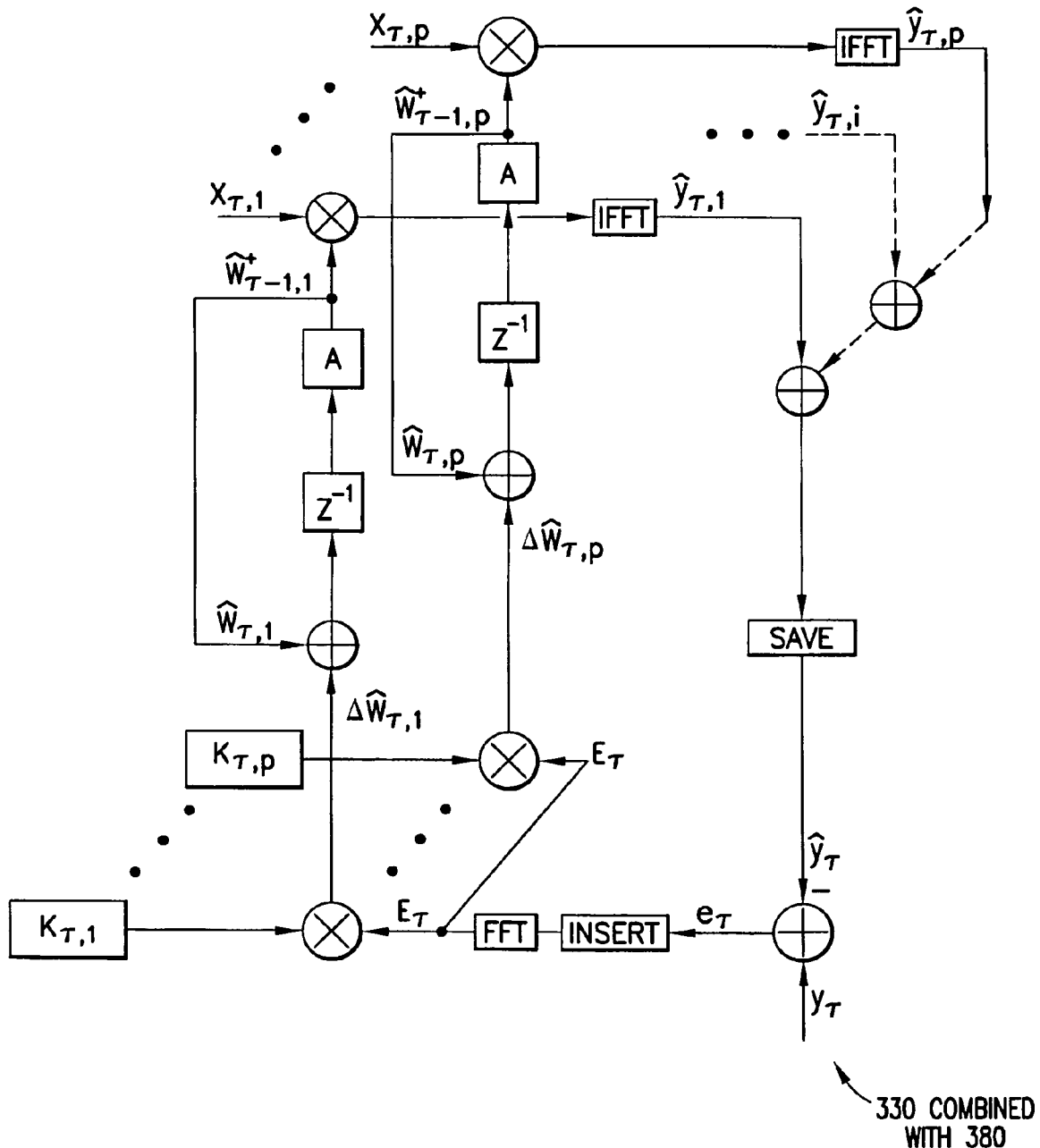
FIG. 3A is a detailed embodiment of the adaptive subsystem in combination with the echo canceller shown in block forms at FIG. 3.

The adaptive subsystem 330 provides outputs of the estimated echo path per channel $[\hat{W}_{\tau,1}, \ldots, \hat{W}_{\tau,p}]$ to the model parameters estimation module 370, and also the channelwise estimated echo signal $[\hat{Y}_{\tau,1}, \ldots, \hat{Y}_{\tau,p}]$ to the echo canceller 370. One particular embodiment of the digital signal processing structure of the adaptive subsystem 330, combined with the echo canceller 380, is shown in detail at FIG. 3A.

The channelwise adaptation controller 340 receives the multichannel input signal $[X_{\tau,1}, \ldots X_{\tau,p}]$ from the multichannel input generator 310, and model parameters $\theta_\tau$ from the model parameter estimation module 370. The model parameters $\theta_\tau$ include multichannel process noise covariance for the echo path state $\underline{\Psi}_\tau^\Delta$ (which in turn contains a p*p process noise terms $\Psi_{\tau,i,j}^\Delta$), and the observation/near-end noise covariance $\Psi_\tau^s$.

The channelwise adaptation controller 340 operates to compute the predicted multichannel state error covariance $\underline{P}_{\tau-1}^+$, such as is shown by equation (19) of FIG. 3B for the channel indices $\{i,j\}$, where $A_i$ and $A_j$ are the channelwise state transition coefficients. For practical reasons, in one embodiment all $A_i$ and $A_j$ have been set to the same constant A. The channelwise adaptation controller 340 also computes a residual state-error covariance $D'_\tau$ such as is shown at equation (20) of FIG. 3B, and computes the channelwise Kalman gain $[K_{\tau,1}, \ldots, K_{\tau,p}]$ (e.g., as shown at equation (21) of FIG. 3B) and injects it into the adaptive subsystem 330 as the channel-wise optimal adaptation parameter. The Kalman gains comprise a common inverse-term $D'_\tau$ which is calculated efficiently exploiting the diagonality of the involved quantities in the DFT-domain. The common inverse-term contains an estimate of the near-end noise covariance $\Psi_\tau^s$ which is obtained from the model parameters estimation module 370. The inclusion of the near-end noise covariance $\Psi_\tau^s$ provides the multichannel adaptive subsystem 330 with unique robustness.

Further, the channelwise adaptation controller 340 implements a multichannel Riccati difference equation (e.g., equation 24 of FIG. 3B) to recursively compute the multichannel state error covariance $\underline{P}_\tau$. Utilizing the multichannel state error covariance $\underline{P}_\tau$ in the computation of the Kalman gain automatically provides de-correlation among the channels of the adaptive structure, and thus renders any additional orthogonalization stage unnecessary.

By the above processes, the channelwise adaptation controller 340 outputs the multichannel echo path state error covariance $\underline{P}_\tau$ to the model parameter estimation module 370, outputs the residual multichannel state estimation covariance $D'_\tau$ to the post-filter controller 390, and finally outputs the channelwise Kalman gain parameter $[K_{\tau,1}, \ldots, K_{\tau,p}]$ to the adaptive subsystem 330.

The echo canceller 380 operates on inputs of the channelwise estimated echo signal $[\hat{Y}_{\tau,1}, \ldots, \hat{Y}_{\tau,p}]$ received from the adaptive subsystem 330, and the DFT-domain microphone signal $Y_\tau$ converted by DFT block 305 to the DFT domain from the sample-wise microphone signal $y_t$. The echo canceller 380 operates to add together all the channel-wise estimates $\hat{Y}_{\tau,i}$ of the echo signal to compute the estimated microphone/echo signal $\hat{Y}_\tau$. The echo canceller 380 then subtracts the estimated microphone signal $\hat{Y}_\tau$ from the DFT-domain microphone signal $Y_\tau$ and outputs the DFT-domain error signal vector $E_\tau$. These collective operations are reflected at equation (22) of FIG. 3B. The echo canceller 380 then outputs the DFT-Domain error signal $E_\tau$ to the post-filter 396, to the post-filter controller 390, to the adaptive subsystem 330, to the basis selection module 320 and to the model parameter estimation module 370. Similar to the 2E- and M-steps noted above for FIG. 2, functions of the adaptive subsystem 330 of FIG. 3, together with functions of the channelwise adaptation controller 340 and the echo canceller 380 may be considered as a multichannel expectation step (ME-Step).

The model parameter estimator module 370 takes five inputs: the estimated echo path per channel $[\hat{W}_{\tau,1}, \ldots, \hat{W}_{\tau,p}]$ from the adaptive subsystem 330; the DFT-domain signal $\hat{S}'_\tau$ the output of the Bayesian post-filter 396; the multichannel input signal $[X_{\tau,1}, \ldots X_{\tau,p}]$ from the multichannel input generator 310; the DFT-domain error signal $E_\tau$ from the echo canceller 380; and the multichannel echo path state error covariance $\underline{P}_\tau$ from the channelwise adaptation controller 340. This module 370 operates to estimate the model parameters $\theta_\tau$ which are detailed above, and carries out the estimation of the near-end speech and noise covariances $\Psi_\tau^s$ as well as computing the multichannel process noise covariance $\underline{\Psi}_\tau^\Delta$ for the first-order multichannel Markov model, which is used to model the evolution of the echo path in each channel. The model parameter estimator module 370 outputs the model parameter set $\theta_\tau$ to the channelwise adaptation controller 340.

The post-filter controller 390 computes an optimal weighting function $\psi_\tau$ for the suppression of residual nonlinear and linear echo in the error signal $E_\tau$, and additionally in some embodiments it can provide for noise reduction as well. The post-filter controller 390 computes this from four inputs: the equivalent multichannel far-end signal $[X_{\tau,1}, \ldots X_{\tau,p}]$ which it receives from the multichannel input generator 310; the DFT-domain error signal $E_\tau$ which it receives from the echo canceller 380; the DFT-domain output $\hat{S}'_\tau$ of the post-filter 396 (which is the signal to be transmitted to the far-end after conversion to the time domain signal $\hat{s}'_t$ by the IDFT block 398); and the residual multichannel state error covariance $D'_\tau$ which it receives from the channelwise adaptation controller 340. The resulting DFT-domain weighting function $\psi_\tau$ is output to the Bayesian Post-filter 396.

The Bayesian post-filter 396 takes inputs of the DFT-domain error signal $E_\tau$ from the echo canceller 380 and the DFT-domain weighting function $\psi_\tau$ from the post-filter controller 390 and operates to window (or pseudo-window) the input signals to execute a credible overlap-add or overlap-save convolution in the DFT-domain. It also filters the error signal $E_\tau$ to suppress residual linear and nonlinear echo (and in some embodiments it might also suppress near-end noise as well). The Bayesian post filter 396 then outputs the DFT-domain signal $\hat{S}'_\tau$ which is to be transmitted to the far-end after conversion to the time domain. In principle the DFT-domain signal $\hat{S}'_\tau$ can be converted to a time-domain sample-based form $\hat{s}'_t$ if required as shown in FIG. 3. The DFT-domain signal $\hat{S}'_\tau$ is also output to the post-filter controller 390 and to the model parameters estimation module 370.

If we collectively term from FIG. 3 the multichannel input generator 310, basis selection module 320, adaptive subsystem 330, channelwise adaption controller 340, echo canceller 380 and model parameters estimation module 370 as the Multichannel State-Space Frequency Domain Adaptive Filter (MCSSFDAF), there are two distinct implementations which are both efficient in practice. There is a block diagonal form (Block Diagonal Multichannel State-Space Frequency-Domain Adaptive Filter or BD-MCSSFDAF) which is the implementation specifically detailed above for FIG. 3. And there is a fully diagonal form (Fully Diagonal Multichannel State-Space Frequency-Domain Adaptive Filter or FD-MCSSFDAF). Whereas the former BD implementation would utilize equations (19), (20), (21) and (24) of FIG. 3B in the channelwise adaptation controller 340, the latter FD implementation would instead use equations (25), (26), (27) and (28) of FIG. 3B in that controller 340. The FD implementation is seen to be a lower complexity version of the former. Regardless, both BD and FD implementations may be advantageously implemented with fast Fourier Transform/inverse fast Fourier transform FFT/IFFT vector mathematics. Both implementations are Bayesian estimators in that they each output both mean and covariance of the compound unknown quantity.

The Multichannel State-Space Frequency Domain Adaptive Filter MCSSFDAF, of which FIG. 3 illustrates a particular embodiment, provides the following technical effects and advantages. First, modeling the unknown quantities as compound random variables enables the full posteriors to be inferred, which is actually estimation over a probability mass rather point estimates. Such a mechanism renders the MCSSFDAF engine 300 more robust in the presence of outliers and variations. Second, the multichannel state-space model described above over the unknown compound random variables is a basis for the derivation of a recursive Bayesian estimator, which can optimally track the evolution of the unknown states in each channel. Third, containing the derivation within the Bayesian framework allows for concrete mathematical statements about robustness, stability and convergence characteristics of the algorithm. Fourth, the contained derivational frame-work provides quantities like the multichannel state-error covariances, which can be utilized not only for Kalman gain computation and robust channelwise adaptation control including input signal de-correlation, but also to design an effective post-filter stage. Fifth, the system has a built-in model evaluation mechanism, which keeps updating the underlying model parameters. Sixth, being a basis generic system allows it to extract the best possible performance in a given situation and opens doors for possible convex combination. And finally, as noted above the system can be transformed from a block diagonal form (BD-MCSSFDAF) to a fully diagonal form (FD-MCSSFDAF) and executed for special cases in a low complexity mode. Both of these implementations can be implemented with FFT/IFFT and basic vector mathematics.

The MCSSFDAF embodiments exhibit the following distinctions over other known echo cancellation estimators, each of which is seen to be a novel feature of this embodiment of the invention.

Setting up a multichannel system based on a multichannel state-space model with a basis generic multichannel input signal generator.

Absorbing the unknown nonlinear expansion coefficients into the unknown echo path to form a compound unknown stochastic quantity, which we term as the effective echo path per channel.

Subsequent setting up of a multichannel Bayesian adaptive subsystem for the joint estimation of the echo path in each channel.

Optimum bin-wise adaptation via a DFT-domain channelwise Kalman gain parameter. This optimum gain parameter also provides the necessary de-correlation in the adaptation module to avoid the need for any additional orthogonalization sub-system.

Making use of multichannel state-error covariance in the post-filter controller to optimally feed the Bayesian post-filter for residual echo suppression.

Setting up of a model parameter estimation module to align the adaptive system with the physical real-world model. Model parameter is a name given to a set comprising channel-wise process noise covariance and near-end/observation signal covariance (i.e., speech and noise). This can again be described as the M-Step of the multichannel system. Thus, the subsystem 370 of MCSSFDAF and 270 of VBSSFDAF are in functionality the respective M-Steps.

Figures 4, 4A:
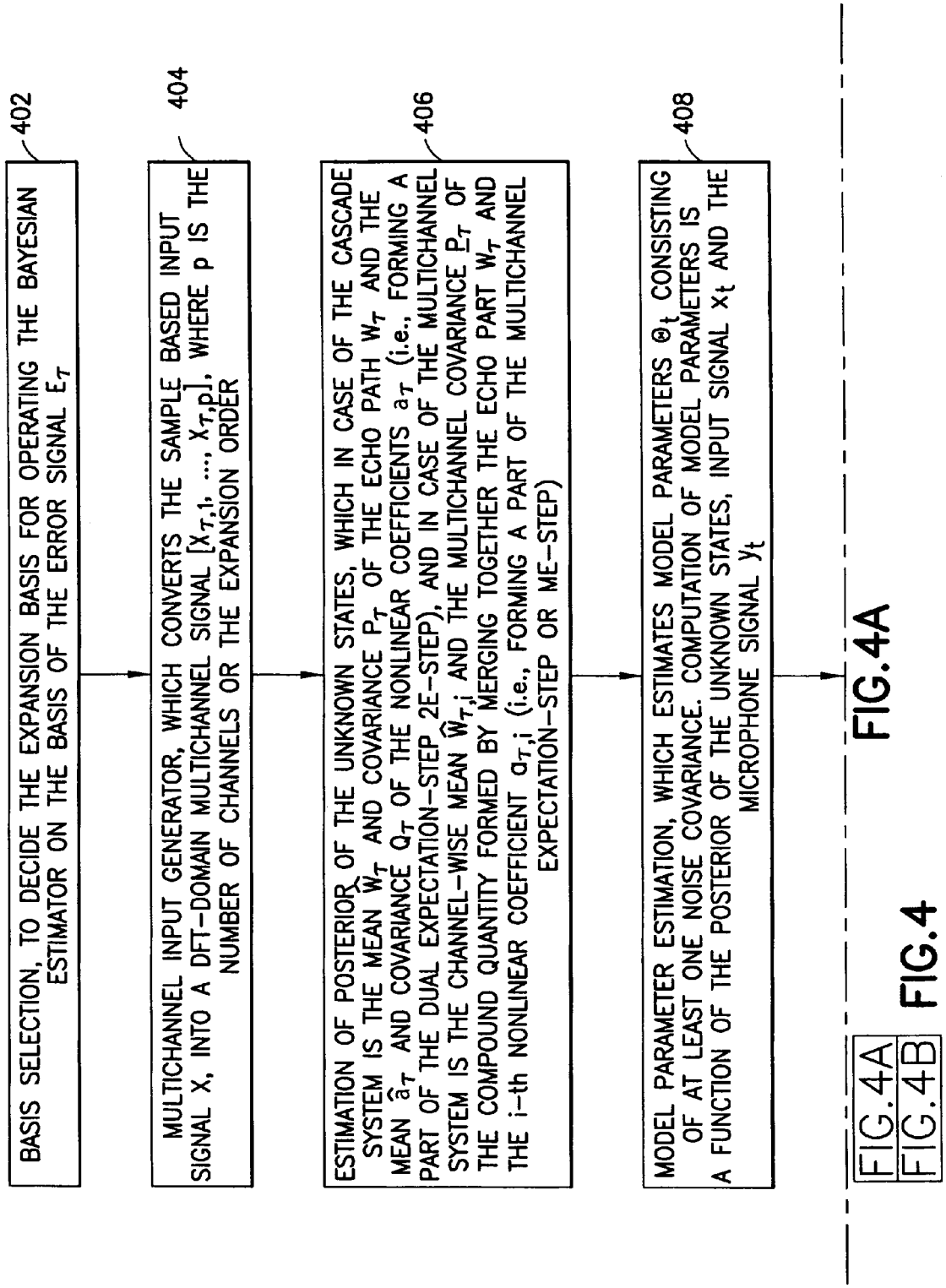
FIG. 4, shown on two drawing sheets as FIGS. 4A-B, is a continuous logic flow diagram that illustrates the operation of a method, and a result of execution of computer program instructions or code which are embodied on a computer readable memory, in accordance with the exemplary embodiments of this invention as illustrated at FIGS. 2 and 3.

FIG. 4 is a logic flow diagram that illustrates the operation of a method, and a result of execution of computer program instructions, in accordance with the exemplary Variational Bayesian State-Space Frequency-Domain Adaptive Filter VBSSFDAF as well as the exemplary Multichannel State-Space Frequency-Domain Adaptive Filter MCSSFDAF embodiments of this invention. As with certain of the claims below, certain parameters at FIG. 4 include neither a t nor a τ subscript, indicating the parameter may be either in the time or in the frequency domain.

When FIG. 4 is executed in the frequency domain as described with reference to FIGS. 2 and 3 above, the far-end signal $x_t$ is converted to a multichannel input $[X_{\tau,1}, \ldots X_{\tau,p}]$ by operating on the far-end signal $x_t$ by an expansion series selected by the basis selection module 220, 320 in dependence on the error signal $E_\tau$.

In either the time or frequency domain, the joint Bayesian estimator of FIG. 4 may be disposed in a host device such as that shown at FIG. 5, which includes a radio receiver which provides the far-end signal $x_t$ from which the microphone signal $y_t$ derives; and a radio transmitter for sending the filtered error signal $\hat{s}'_t$ to a source from which the radio receiver received the far-end signal $x_t$.

In accordance with FIG. 4 (continuous but shown as FIGS. 4A-B on separate sheets), the joint Bayesian estimator block 402 decides the expansion basis for operating the Bayesian estimator. The selection of the type of expansion basis is carried out on the basis of the error signal $E_\tau$. The choice in 402 is made between the truncated odd Fourier series or truncated odd Power series. The decision process can also be embodied as a sophisticated decision directed approach opening doors for a convex combination of both types of expansions.

In block 404 the multichannel input generator of the joint Bayesian estimator converts the sample based input signal $x_t$ into a DFT-domain multichannel signal $[X_{\tau,1}, \ldots X_{\tau,p}]$, where p is the number of channels or the expansion order. The type of expansion is dependent on the decision provided by the block 402.

The block 406 of the joint Bayesian estimator carries out the estimation of posterior of the unknown states, which in case of the cascade system is the mean $\hat{W}_\tau$ and covariance $P_\tau$ of the echo path $W_\tau$ and the mean $\hat{a}_\tau$ and covariance $Q_\tau$ of the nonlinear coefficients $a_\tau$ (i.e., forming a part of the dual expectation-step 2E-Step), and in case of the multichannel system is the channel-wise mean $\hat{W}_{\tau,i}$ and the multichannel covariance $\underline{P}_\tau$ of the compound quantity formed by merging together the echo path $W_\tau$ and the $i^{th}$ nonlinear coefficient $a_{\tau,i}$ (i.e., forming a part of the multichannel expectation-step or ME-Step). For clarity it can be stated that adaptive subsystem 330, channelwise adaptation controller 340 and the echo canceller 380 together describe the ME-Step. The estimation of the posterior is dependent on the Kalman gain factor(s) $K_\tau$ and, directly or indirectly, on at least one of the model parameters $\theta_\tau$.

Block 408 performs model parameter estimation, which estimates model parameters $\theta_\tau$ consisting of at least one noise covariance $\Psi_\tau$. Computation of model parameters is a function of the posterior of the unknown states, input signal $x_t$ and the microphone signal $y_t$.

For the VBSSFDAF/cascade system of FIG. 2, model parameter set is $\theta_\tau$ and comprises process noise covariance for the echo path state $\Psi_\tau^\Delta$, process noise covariance for nonlinear expansion coefficients $\Psi_\tau^a$, and observation noise covariance $\Psi_\tau^s$. In this case the unknown echo path states $W_\tau$ are conditional on the process noise covariance for the echo path state $\Psi_\tau^\Delta$ and the observation noise covariance $\Psi_\tau^s$; and the non-linear coefficients $a_\tau$ are conditional on the process noise covariance for nonlinear expansion coefficients $\Psi_\tau^a$ and the observation noise covariance $\Psi_\tau^s$.

For the MSSFDAF/multichannel system of FIG. 3, the model parameter set $\underline{\theta}_\tau$ comprises multichannel process noise covariance $\underline{\Psi}_\tau^\Delta$ for the echo path state and observation noise covariance $\Psi_\tau^s$; and the channelwise Kalman gain parameters $[K_{\tau,1}, \ldots, K_{\tau,p}]$ are generated in dependence on an estimate of the near-end noise covariance $\Psi_\tau^s$ via a common inverse-term $D'_\tau$, and it is also dependent on the estimated posterior in the adaptive subsystem 330.

Block 410 carries out the computation of Kalman gain factor(s) $K_\tau$ for optimal adaptation of the unknown states in the expectation steps i.e., 2E-Step and the ME-Step. The Kalman gain factor is conditioned on at least one of the model parameters $\theta_\tau$, the input signal $x_t$, and the estimated posterior of the unknown states.

For the VBSSFDAF/cascade system of FIG. 2, the echo signal $\hat{Y}_\tau$ is estimated by jointly modeling coefficients $a_\tau$ of loudspeaker nonlinearity and unknown echo path states $W_\tau$ as random variables with a first-order Markov property, in which the coefficients $a_\tau$ and the unknown echo path states $W_\tau$ are adapted by respective Kalman gain factors $K_{a,\tau}$ and $K_{\omega,\tau}$.

For the MSSFDAF/multichannel system of FIG. 3, the Kalman gain factor $\underline{K}_\tau$ comprises a channelwise Kalman gain parameters $[K_{\tau,1}, \ldots, K_{\tau,p}]$ and the estimated acoustic echo signal $\hat{Y}_\tau$ is generated from channelwise estimated echo signals $\hat{Y}_{\tau,i}$.

Block 412 computes the estimated echo signal $\hat{Y}_\tau$ using the multichannel input signal $[X_{\tau,1}, \ldots X_{\tau,p}]$ and the estimated posterior.

For the VBSSFDAF/cascade system of FIG. 2, the estimated acoustic echo signal $\hat{Y}_\tau$ is generated by convolving an estimated non-linearly mapped input signal $\hat{\tilde{X}}_\tau$ with a mean of the unknown echo path states $\hat{W}_\tau$.

For the MSSFDAF/multichannel system of FIG. 3, the estimated acoustic echo signal $\hat{Y}_\tau$ is generated by adding all the channelwise estimated echo signals $\hat{Y}_{\tau,i}$.

Figure 4B:
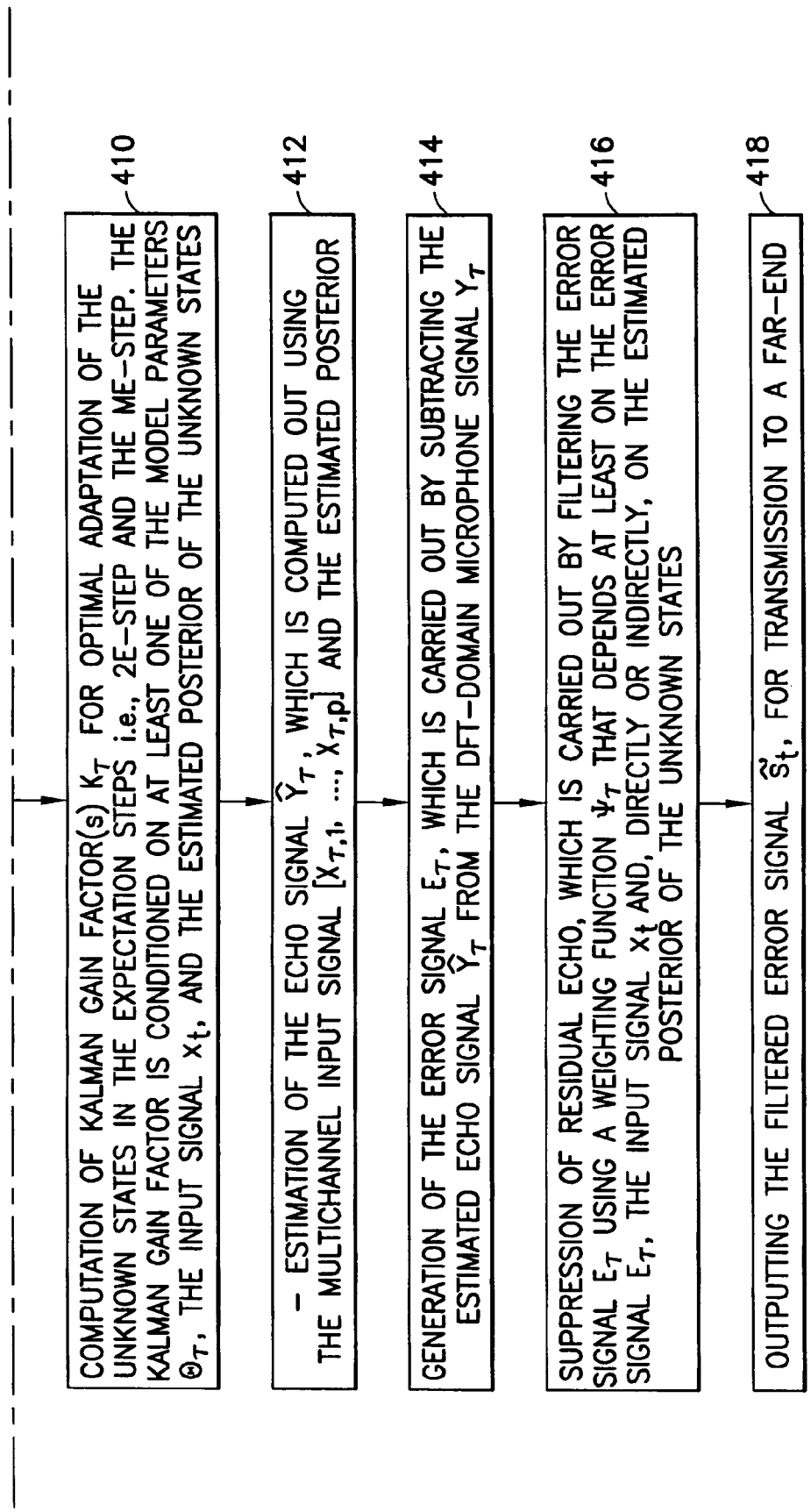

At block 414 which continues at FIG. 4B, the estimated echo signal $\hat{Y}_\tau$ is subtracted from a microphone signal $Y_\tau$ to generate an error signal $E_\tau$.

At block 416 the error signal $E_\tau$ is filtered to suppress residual linear and nonlinear error according to a weighting function $\psi_\tau$ which depends on the error signal $E_\tau$ and the far-end signal $x_t$. This is shown in FIGS. 2 and 3 as the Bayesian post-filter 296, 396 and post-filter controllers 290, 390.

And at block 418 the filtered error signal $\hat{s}'_t$ is output for transmission to a far-end.

The various blocks shown in FIG. 4 may be viewed as method steps, and/or as operations that result from operation of computer program code, and/or as a plurality of coupled logic circuit elements constructed to carry out the associated function(s). Embodiments of the invention may be implemented in hardware/circuitry, as software tangibly embodied on a computer readable memory, or as a combination of both hardware and embodied software/firmware.

Exemplary but non-limiting embodiment of a host device in which embodiments of this invention might be implemented or otherwise disposed, include cellular telephones, personal digital assistants (PDAs) having wireless audio communication capabilities, portable computers having wireless audio communication capabilities, Internet appliances permitting wireless Internet access and audio communications, as well as portable units or terminals that incorporate combinations of such functions.

The computer readable memory storing software embodiments of the invention may be of any type suitable to the local technical environment and may be implemented using any suitable data storage technology, such as semiconductor based memory devices, flash memory, magnetic memory devices and systems, optical memory devices and systems, fixed memory and removable memory. The one or more processors executing such stored software implementations may be of any type suitable to the local technical environment, and may include one or more of general purpose computers, special purpose computers, microprocessors, digital signal processors (DSPs) and processors based on a multicore processor architecture, as non-limiting examples.

FIG. 5 illustrates an exemplary host device/mobile terminal in both plan view (left) and sectional view (right), and the invention may be embodied in one or some combination of the function-specific components detailed below. Other exemplary host devices include a non-cellular cordless telephone handset (e.g., 900 MHz/2.4 or 5.8 GHz band for use in conjunction with a base unit which has the connection to the telephone network). At FIG. 5 the mobile terminal 10 has a graphical display interface 20 and a user interface 22 illustrated as a keypad but understood as also encompassing touch-screen technology at the graphical display interface 20 and voice-recognition technology received at the microphone 24.

Within the sectional view of FIG. 5 are seen multiple transmit/receive antennas 36 that are typically used for cellular communication. The antennas 36 may be multi-band for use with other radios in the mobile terminal. A radio-frequency (RF) chip 40 demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

There may be a separate audio processor 46 for controlling signals to and from the speakers 34 and the microphone 24. Exemplary embodiments of the joint Bayesian estimator detailed herein may be disposed in or executed by such an audio processor, in whole or in part (e.g., in combination with the main/master processor or other processors).

Certain embodiments of the mobile terminal 10 may also include one or more secondary radios such as a wireless local area network radio WLAN and a Bluetooth® BT radio shown which may be used to port the far-end signal to external speakers. Throughout the apparatus are various memories such as random access memory RAM 43, read only memory ROM 45, and in some embodiments removable memory such as the illustrated memory card 47 on which the various programs 10C are stored. There is also a main processor 10A to which other processors are slaved, at least in timing. All of these components within the mobile terminal 10 are normally powered by a portable power supply such as a battery 49.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. Some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method for a handheld portable communication device, comprising:
  performing an echo suppression process on the handheld portable communication device by performing at least the following:
    estimating a model parameter set comprising at least one noise covariance as a function of at least an estimated or a predicted posterior of at least one unknown state quantity, a far-end signal and an error signal;
    generating a gain factor in dependence on the at least one noise covariance;
    using the gain factor to adapt the posterior of the at least one unknown state quantity;
    estimating an acoustic echo signal using the adapted posterior of the at least one unknown state quantity, wherein the acoustic echo signal comprises an estimate of an acoustic echo caused at least by the far-end signal being played by a loudspeaker and resultant output picked up by a microphone;
    subtracting the estimated acoustic echo signal from a microphone signal from the microphone to generate an error signal;
    filtering the error signal to suppress residual linear and nonlinear error caused at least by the acoustic echo according to a weighting function which depends on the error signal, the far-end signal and the adapted posterior of the at least one unknown state quantity;
    outputting the filtered error signal for transmission to a far-end,
  in which the handheld portable communication device comprises:
    a radio receiver which provides the far-end signal from which the microphone signal derives; and
    a radio transmitter for sending the filtered error signal to a source from which the radio receiver received the far-end signal.

2. The method according to claim 1, executed in the frequency domain in which the far-end signal is converted to a multichannel input by operating on the far-end signal by an expansion series selected in dependence on the error signal.

3. The method according to claim 1, in which the at least one unknown state quantity comprises a mean echo path and its estimation error covariance, and in which estimating the acoustic echo signal comprises explicitly modeling coefficients of loudspeaker nonlinearity and unknown echo path states as random variables with a first-order Markov property, in which the posterior on the coefficients and the unknown echo path states are adapted by respective gain factors.

4. The method according to claim 3, in which:
  the model parameter set comprises process noise covariance for the echo path state, process noise covariance for nonlinear expansion coefficients, and observation noise covariance;

the adapted posterior of the unknown echo path states is conditional on the process noise covariance for the echo path state and the observation noise covariance; and the adapted posterior of the non-linear coefficients is conditional on the process noise covariance for nonlinear expansion coefficients and the observation noise covariance.

5. The method according to claim 4, in which the estimated acoustic echo signal is generated by convolving an estimated non-linearly mapped input signal with a mean of the unknown echo path states.

6. The method according to claim 1, in which the handheld portable communication device comprises a multichannel system, in which the gain factor comprises channelwise gain parameters and the estimated acoustic echo signal is generated from channelwise estimated echo signals.

7. The method according to claim 6, in which:
the model parameter set comprises multichannel process noise covariance for the echo path state and observation noise covariance; and
the channelwise gain parameter is generated in dependence on an estimate of the near-end noise covariance via a common inverse-term.

8. A handheld portable communication device, comprising at least one processor and at least one memory storing computer program instructions;
in which the at least one processor is configured with the at least one memory and the computer program instructions to at least:
perform an echo suppression process on the handheld portable communication device by performing at least the following:
estimate a model parameter set comprising at least one noise covariance as a function of at least an estimated or a predicted posterior of at least one unknown state quantity, a far-end signal and an error signal;
generate a gain factor in dependence on the at least one noise covariance;
adapt the posterior of the at least one unknown state quantity using the gain factor;
estimate an acoustic echo signal using the adapted posterior of the at least one unknown state quantity, wherein the acoustic echo signal comprises an estimate of an acoustic echo caused at least by the far-end signal being played by a loudspeaker and resultant output picked up by a microphone;
subtract the estimated echo signal from a microphone signal from the microphone to generate an error signal;
filter the error signal to suppress residual linear and nonlinear error according to a weighting function which depends on the error signal, the far-end signal and the estimated posterior of the at least one unknown state quantity;
output the filtered error signal for transmission to a far-end,
in which the handheld portable communication device further comprises:
a radio receiver which provides the far-end signal from which the microphone signal derives; and
a radio transmitter for sending the filtered error signal to a source from which the radio receiver received the far-end signal.

9. The handheld portable communication device according to claim 8, in which the at least one processor is configured with the at least one memory and the computer program instructions to estimate, generate, adapt, subtract and filter as said in claim 8 in the frequency domain, and further to:
convert the far-end signal to a multichannel input by operating on the far-end signal by an expansion series selected in dependence on the error signal.

10. The handheld portable communication device according to claim 8, in which the at least one unknown state quantity comprises a mean echo path and its estimation error covariance,
and in which the at least one processor is configured with the at least one memory and the computer program instructions estimate the echo signal by explicitly modeling coefficients of loudspeaker nonlinearity and unknown echo path states as random variables with a first-order Markov property, in which the posterior on the coefficients and the unknown echo path states are adapted by respective gain factors.

11. The handheld portable communication device according to claim 10, in which:
the model parameter set comprises process noise covariance for the echo path state, process noise covariance for nonlinear expansion coefficients, and observation noise covariance;
the adapted posterior of the unknown echo path states is conditional on the process noise covariance for the echo path state and the observation noise covariance; and
the adapted posterior of the non-linear coefficients is conditional on the process noise covariance for nonlinear expansion coefficients and the observation noise covariance.

12. The handheld portable communication device according to claim 11, in which the at least one processor is configured with the at least one memory and the computer program instructions to generate the estimated acoustic echo signal by convolving an estimated non-linearly mapped input signal with a mean of the unknown echo path states.

13. The handheld portable communication device according to claim 8, in which:
the handheld portable communication device comprises a multichannel system, in which the gain factor comprises a channelwise gain parameter; and
the at least one processor is configured with the at least one memory and the computer program instructions to generate the estimated acoustic echo signal from channelwise estimated echo signals.

14. The handheld portable communication device according to claim 13, in which:
the model parameter set comprises multichannel process noise covariance for an echo path state and observation noise covariance; and
at least one processor is configured with the at least one memory and the computer program instructions to generate the channelwise gain parameter in dependence on an estimate of the near-end noise covariance via a common inverse-term.

15. A method for a handheld portable communication device, comprising:
performing an echo suppression process on the handheld portable communication device by performing at least the following:
selecting, based on an error signal, an expansion basis from a plurality of basis function expansions for operating the estimator;
using the selected expansion basis for converting a sample based input signal into a frequency domain multichannel signal having a number of portions, where the number of portions is a total number of channels or an expansion order of the selected expansion basis;

estimating posteriors of at least two unknown state quantities;

estimating model parameters comprising at least one noise covariance as a function of the estimated posteriors of the at least two unknown state quantities, the input signal and a microphone signal from a microphone;

computing at least one gain factor for adapting the posteriors of the at least two unknown state quantities in dependence on at least one of the estimated model parameters, the input signal, and the estimated posteriors of the at least two unknown state quantities;

estimating an acoustic echo signal from the multichannel input signal and the adapted posteriors of the at least two unknown state quantities, wherein the acoustic echo signal comprises an estimate of an acoustic echo caused at least by the far-end signal being played by a loudspeaker and resultant output picked up by the microphone;

generating the error signal by subtracting the estimated echo signal from a frequency-domain version of the microphone signal;

suppressing residual linear and nonlinear error caused at least by the acoustic echo by filtering the error signal using a weighting function that depends at least on the error signal, the input signal and directly or indirectly on the adapted posteriors of the unknown state quantities;

outputting the filtered error signal for transmission to a far-end;

in which the handheld portable communication device comprises:
  a radio receiver which provides the far-end signal from which the microphone signal derives; and
  a radio transmitter for sending the filtered error signal to a source from which the radio receiver received the far-end signal.

16. The method according to claim 15, in which the at least two unknown state quantities comprise mean and covariance of an echo path, and mean and covariance of nonlinear coefficients.

17. The method according to claim 15, in which the handheld portable communication device comprises a multichannel system and the at least two unknown state quantities comprise channel wise mean and multichannel covariance of a compound quantity formed by merging together the echo path and a nonlinear coefficient.

18. A handheld portable communication device, comprising:
  at least one processor; and
  at least one memory including computer program code, the at least one memory and the computer program code configured to, with the at least one processor, cause the apparatus to perform at least the following:
    perform an echo suppression process on the handheld portable communication device by performing at least the following:
      select, based on an error signal, an expansion basis from a plurality of basis function expansions for operating the estimator;
      convert a sample based input signal into a frequency domain multichannel signal using the selected expansion basis, where the frequency domain multichannel signal has a number of portions and where the number of portions is a total number of channels or an expansion order of the selected expansion basis;
      estimate posteriors of at least two unknown state quantities;
      estimate model parameters comprising at least one noise covariance as a function of the estimated posteriors of the at least two unknown state quantities, the input signal and a microphone signal from a microphone;
      compute at least one gain factor for adapting the posteriors of the at least two unknown state quantities in dependence on at least one of the estimated model parameters, the input signal, and the estimated posteriors of the at least two unknown state quantities;
      estimate an acoustic echo signal from the multichannel input signal and the adapted posteriors of the at least two unknown state quantities, wherein the acoustic echo signal comprises an estimate of an acoustic echo caused at least by the far-end signal being played by a loudspeaker and resultant output picked up by a microphone; and
      generate the error signal by subtracting the estimated echo signal from a frequency-domain version of the microphone signal;
      suppress residual linear and nonlinear error caused at least by the acoustic echo by filtering the error signal using a weighting function that depends at least on the error signal, the input signal and directly or indirectly on the adapted posteriors of the unknown state quantities;
      to direct the filtered error signal for transmission to a far-end;
    in which the handheld portable communication device further comprises:
      a radio receiver which provides the far-end signal from which the microphone signal derives; and
      a radio transmitter for sending the filtered error signal to a source from which the radio receiver received the far-end signal.

19. The handheld portable communication device according to claim 18, in which the at least two unknown state quantities comprise mean and covariance of the echo path, and mean and covariance of nonlinear coefficients.

20. The handheld portable communication device according to claim 18, in which the handheld portable communication device comprises a multichannel system and the at least two unknown state quantities comprise channel wise mean and multichannel covariance of a compound quantity formed by merging together the echo path and a nonlinear coefficient.

* * * * *

UNITED STATES PATENT AND TRADEMARK OFFICE
CERTIFICATE OF CORRECTION

PATENT NO. : 8,924,337 B2
APPLICATION NO. : 13/068341
DATED : December 30, 2014
INVENTOR(S) : Malik et al.

It is certified that error appears in the above-identified patent and that said Letters Patent is hereby corrected as shown below:

In the Claims:

Claim 18, col. 24, line 40 "to" should be deleted in front of "direct".

Signed and Sealed this
Thirty-first Day of March, 2015

Michelle K. Lee
*Director of the United States Patent and Trademark Office*